United States Patent
Wang et al.

(10) Patent No.: US 12,262,389 B2
(45) Date of Patent: Mar. 25, 2025

(54) TECHNIQUES FOR INDICATING A SIDELINK RECEIVER

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US); Sony Akkarakaran, Poway, CA (US); Jing Sun, San Diego, CA (US); Xiaoxia Zhang, San Diego, CA (US); Ozcan Ozturk, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 17/548,093

(22) Filed: Dec. 10, 2021

(65) Prior Publication Data
US 2023/0189277 A1    Jun. 15, 2023

(51) Int. Cl.
*H04W 72/23*    (2023.01)
*H04W 72/02*    (2009.01)
(Continued)

(52) U.S. Cl.
CPC ........... *H04W 72/23* (2023.01); *H04W 72/02* (2013.01); *H04W 72/1263* (2013.01); *H04W 72/21* (2023.01)

(58) Field of Classification Search
CPC . H04W 72/23; H04W 72/02; H04W 72/1263; H04W 72/21; H04W 72/40; H04W 72/20
See application file for complete search history.

(56) References Cited

U.S. PATENT DOCUMENTS 11,096,161 B2    8/2021    Wu et al.
2017/0245292 A1*  8/2017   Agiwal ................. H04W 72/23
(Continued)

FOREIGN PATENT DOCUMENTS

WO    WO-2020192777 A1    10/2020

OTHER PUBLICATIONS

Qualcomm Incorporated: "Mode 1 Resource Allocation for NR-V2X", R1-1907270, 3GPP TSG RAN WG1 Meeting #97, Reno, USA, May 13-17, 2019, pp. 1-3.

(Continued)

*Primary Examiner* — Steven Hieu D Nguyen
(74) *Attorney, Agent, or Firm* — Holland & Hart LLP/QUALCOMM Incorporated

(57) ABSTRACT

Methods, systems, and devices for wireless communication are described. A base station may transmit a grant to a first user equipment (UE) that indicates a resource allocation for a sidelink communication, either from the first UE to a second UE or from the second UE to the first UE. The grant may include a destination identifier associated with the sidelink communication, as well as a mapping between the resource allocation and the destination identifier. The destination identifier may be based on information in an indication received from the first UE. In some examples, the base station may configure a default receiver UE for transmissions from the first UE, and the base station may identify a receiver UE in the grant if the intended receiver UE is different than the default receiver UE.

30 Claims, 17 Drawing Sheets

(51) Int. Cl.
*H04W 72/1263* (2023.01)
*H04W 72/21* (2023.01)

(56) References Cited

U.S. PATENT DOCUMENTS

| | | | |
|---|---|---|---|
| 2020/0029353 A1* | 1/2020 | Xu | H04W 72/21 |
| 2020/0170023 A1* | 5/2020 | Kim | H04W 72/20 |
| 2021/0105787 A1 | 4/2021 | Park et al. | |
| 2021/0212104 A1* | 7/2021 | Li | H04W 72/23 |
| 2022/0078818 A1* | 3/2022 | Sun | H04L 67/535 |
| 2023/0131882 A1* | 4/2023 | Lin | H04W 72/0446 |
| | | | 370/329 |
| 2023/0189252 A1* | 6/2023 | Lee | H04W 72/1263 |
| | | | 370/329 |

OTHER PUBLICATIONS

International Search Report and Written Opinion—PCT/US2022/080773—ISA/EPO—Feb. 28, 2023.

* cited by examiner

TECHNIQUES FOR INDICATING A SIDELINK RECEIVER

The following relates to wireless communications, including techniques for sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first UE is described. In some examples, the method may include transmitting, to a base station, an indication of a sidelink communication, the indication including a destination identifier associated with a second UE. In some examples, the method may further include receiving a grant in response to the indication, the grant indicating a mapping between a resource allocation and the destination identifier associated with the second UE. In some examples, the method may further include communicating, in response to receiving the grant, a sidelink signal with the second UE according to the resource allocation.

An apparatus for wireless communication at a first UE is described. The apparatus may include a processor and memory coupled to the processor. In some examples, the processor and memory may be configured to transmit, to a base station, an indication of a sidelink communication, the indication including a destination identifier associated with a second UE. In some examples, the processor and memory may be further configured to receive a grant in response to the indication, the grant indicating a mapping between a resource allocation and the destination identifier associated with the second UE. In some examples, the processor and memory may be further configured to communicate, in response to receiving the grant, a sidelink signal with the second UE according to the resource allocation.

Another apparatus for wireless communication at a first UE is described. In some examples, the apparatus may include means for transmitting, to a base station, an indication of a sidelink communication, the indication including a destination identifier associated with a second UE. In some examples, the apparatus may further include means for receiving a grant in response to the indication, the grant indicating a mapping between a resource allocation and the destination identifier associated with the second UE. In some examples, the apparatus may further include means for communicating, in response to receiving the grant, a sidelink signal with the second UE according to the resource allocation.

A non-transitory computer-readable medium storing code for wireless communication at a first UE is described. In some examples, the code may include instructions executable by a processor to transmit, to a base station, an indication of a sidelink communication, the indication including a destination identifier associated with a second UE. In some examples, the code may further include instructions executable by the processor to receive a grant in response to the indication, the grant indicating a mapping between a resource allocation and the destination identifier associated with the second UE. In some examples, the code may further include instructions executable by the processor to communicate, in response to receiving the grant, a sidelink signal with the second UE according to the resource allocation.

In some examples of the method, apparatuses, and non-transitory computer-readable medium described herein, transmitting the indication may include operations, features, means, or instructions for transmitting the indication in an uplink transmission associated with a process number, where the mapping indicated in the grant corresponds to the process number.

Some examples of the method, apparatuses, and non-transitory computer-readable medium described herein may further include operations, features, means, or instructions for receiving, prior to communicating the sidelink signal, a feedback message from the base station, the feedback message including the process number.

In some examples of the method, apparatuses, and non-transitory computer-readable medium described herein, the grant includes one or more bits of the process number.

In some examples of the method, apparatuses, and non-transitory computer-readable medium described herein, transmitting the indication may include operations, features, means, or instructions for transmitting, in the indication, a set of destination identifiers that may be ordered according to the process number, the set of destination identifiers including the destination identifier associated with the second UE.

Some examples of the method, apparatuses, and non-transitory computer-readable medium described herein may further include operations, features, means, or instructions for receiving control signaling indicating an association between the destination identifier and a process number associated with the sidelink communication, where the grant indicates the mapping in accordance with the association.

Some examples of the method, apparatuses, and non-transitory computer-readable medium described herein may further include operations, features, means, or instructions for receiving a second grant in response to the indication, the second grant indicating a second mapping between a second resource allocation and a second destination identifier associated with a third UE, where the indication includes the second destination identifier associated with the third UE, and where the second destination identifier corresponds to a zero buffer size.

Some examples of the method, apparatuses, and non-transitory computer-readable medium described herein may further include operations, features, means, or instructions for transmitting, in response to the second grant, a feedback message to the base station based on the zero buffer size.

Some examples of the method, apparatuses, and non-transitory computer-readable medium described herein may further include operations, features, means, or instructions for transmitting, in response to the second grant, a second sidelink signal to a fourth UE according to the second resource allocation.

In some examples of the method, apparatuses, and non-transitory computer-readable medium described herein, an index corresponding to a third destination identifier associated with the fourth UE may be greater than an index corresponding to the second destination identifier associated with the third UE.

In some examples of the method, apparatuses, and non-transitory computer-readable medium described herein, an index corresponding to a third destination identifier associated with the fourth UE may be less than an index corresponding to the second destination identifier associated with the third UE.

In some examples of the method, apparatuses, and non-transitory computer-readable medium described herein, the destination identifier includes a buffer size identifier associated with the second UE and the buffer size identifier may be transmitted in a buffer status report.

In some examples of the method, apparatuses, and non-transitory computer-readable medium described herein, the destination identifier includes a layer 1 identifier, a layer 2 identifier, or both, associated with the second UE.

Some examples of the method, apparatuses, and non-transitory computer-readable medium described herein may further include operations, features, means, or instructions for receiving control signaling indicating an association between one or more sidelink transmissions and the second UE, where the grant indicates the mapping in accordance with the association.

In some examples of the method, apparatuses, and non-transitory computer-readable medium described herein, the destination identifier includes a resource pool index associated with the second UE.

In some examples of the method, apparatuses, and non-transitory computer-readable medium described herein, the destination identifier includes a cyclic redundancy check scrambling sequence associated with the second UE.

In some examples of the method, apparatuses, and non-transitory computer-readable medium described herein, the grant may be received in a control channel element and the grant indicates the mapping in accordance with an index of the control channel element.

In some examples of the method, apparatuses, and non-transitory computer-readable medium described herein, the grant may be received in a monitoring occasion and the grant indicates the mapping in accordance with a configuration of the monitoring occasion.

In some examples of the method, apparatuses, and non-transitory computer-readable medium described herein, the grant further indicates a cast type associated with communicating the sidelink signal.

In some examples of the method, apparatuses, and non-transitory computer-readable medium described herein, communicating the sidelink signal may include operations, features, means, or instructions for transmitting, in response to receiving the grant, the sidelink signal to the second UE according to the resource allocation.

In some examples of the method, apparatuses, and non-transitory computer-readable medium described herein, communicating the sidelink signal may include operations, features, means, or instructions for receiving, in response to receiving the grant, the sidelink signal from the second UE according to the resource allocation.

A method for wireless communication at a base station is described. In some examples, the method may include receiving, from a first UE, an indication of a sidelink communication, the indication including a destination identifier associated with a second UE. In some examples, the method may further include transmitting, to the first UE, a grant in response to the indication, the grant indicating a mapping between a resource allocation and the destination identifier associated with the second UE. In some examples, the method may further include monitoring for a feedback message associated with a sidelink signal that is communicated with the second UE according to the resource allocation.

An apparatus for wireless communication at a base station is described. The apparatus may include a processor and memory coupled to the processor. In some examples, the processor and memory may be configured to receive, from a first UE, an indication of a sidelink communication, the indication including a destination identifier associated with a second UE. In some examples, the processor and memory may be further configured to transmit, to the first UE, a grant in response to the indication, the grant indicating a mapping between a resource allocation and the destination identifier associated with the second UE. In some examples, the processor and memory may be further configured to monitor for a feedback message associated with a sidelink signal that is communicated with the second UE according to the resource allocation.

Another apparatus for wireless communication at a base station is described. In some examples, the apparatus may include means for receiving, from a first UE, an indication of a sidelink communication, the indication including a destination identifier associated with a second UE. In some examples, the apparatus may further include means for transmitting, to the first UE, a grant in response to the indication, the grant indicating a mapping between a resource allocation and the destination identifier associated with the second UE. In some examples, the apparatus may further include means for monitoring for a feedback message associated with a sidelink signal that is communicated with the second UE according to the resource allocation.

A non-transitory computer-readable medium storing code for wireless communication at a base station is described. In some examples, the code may include instructions executable by a processor to receive, from a first UE, an indication of a sidelink communication, the indication including a destination identifier associated with a second UE. In some examples, the code may further include instructions executable by the processor to transmit, to the first UE, a grant in response to the indication, the grant indicating a mapping between a resource allocation and the destination identifier associated with the second UE. In some examples, the code may further include instructions executable by the processor to monitor for a feedback message associated with a sidelink signal that is communicated with the second UE according to the resource allocation.

In some examples of the method, apparatuses, and non-transitory computer-readable medium described herein, receiving the indication may include operations, features, means, or instructions for receiving the indication in an uplink transmission associated with a process number, where the mapping indicated in the grant corresponds to the process number.

Some examples of the method, apparatuses, and non-transitory computer-readable medium described herein may further include operations, features, means, or instructions for transmitting control signaling indicating an association between the process number and the destination identifier, where the grant indicates the mapping in accordance with the association.

Some examples of the method, apparatuses, and non-transitory computer-readable medium described herein may further include operations, features, means, or instructions for transmitting, to the first UE, a second feedback message including the process number.

In some examples of the method, apparatuses, and non-transitory computer-readable medium described herein, the grant includes one or more bits of the process number.

In some examples of the method, apparatuses, and non-transitory computer-readable medium described herein, receiving the indication may include operations, features, means, or instructions for receiving, in the indication, a set of destination identifiers that may be ordered according to the process number, the set of destination identifiers including the destination identifier associated with the second UE.

In some examples of the method, apparatuses, and non-transitory computer-readable medium described herein, the destination identifier includes a buffer size identifier associated with the second UE and the buffer size identifier may be received in a buffer status report.

In some examples of the method, apparatuses, and non-transitory computer-readable medium described herein, the destination identifier includes a layer 1 identifier, a layer 2 identifier, or both, associated with the second UE.

Some examples of the method, apparatuses, and non-transitory computer-readable medium described herein may further include operations, features, means, or instructions for transmitting control signaling indicating an association between one or more sidelink transmissions and the second UE, where the grant indicates the mapping in accordance with the association.

In some examples of the method, apparatuses, and non-transitory computer-readable medium described herein, the destination identifier includes a resource pool index associated with the second UE.

In some examples of the method, apparatuses, and non-transitory computer-readable medium described herein, the destination identifier includes a cyclic redundancy check scrambling sequence associated with the second UE.

In some examples of the method, apparatuses, and non-transitory computer-readable medium described herein, the grant may be transmitted in a control channel element and the grant indicates the mapping in accordance with an index of the control channel element.

In some examples of the method, apparatuses, and non-transitory computer-readable medium described herein, the grant may be transmitted in a monitoring occasion and the grant indicates the mapping in accordance with a configuration of the monitoring occasion.

In some examples of the method, apparatuses, and non-transitory computer-readable medium described herein, the grant further indicates a cast type associated with communicating the sidelink signal.

DETAILED DESCRIPTION

In some sidelink communications systems, a base station may allocate resources for sidelink communications between UEs, which may be referred to as Mode 1 sidelink communications. For example, the base station may transmit a downlink control information (DCI) message indicating a resource allocation to schedule a transmission of a sidelink signal from a first UE. In some cases, the DCI message may leave the first UE to autonomously select which UE to transmit to in the resource allocation. Data transmission reliability may be improved by enabling the base station to indicate a target UE for the sidelink signal in the grant, for example to improve interference management for the resource allocation.

In accordance with techniques described herein, a base station may transmit a grant (e.g., in a DCI message) to a first UE that indicates a resource allocation for a sidelink communication, either from the first UE to a second UE or from the second UE to the first UE. The grant may include a destination identifier (e.g., an identifier or index corresponding to the first UE or the second UE) associated with the sidelink communication, as well as a mapping between the resource allocation and the destination identifier. The destination identifier may be based on information provided by the first UE to the base station. In some examples, the base station may configure a default receiver UE for transmissions from the first UE, and the base station may identify a receiver UE in the grant if the intended receiver UE is different than the default receiver UE.

By implementing one or more of the described techniques for scheduling sidelink communications, devices of a wireless communications system may be able to effectively implement transmission schemes based on interference management in a manner that increases data throughput and improves latency, which may correspond to improved power consumption and communications reliability, among other considerations. For example, based on indicating a receiver UE for a sidelink communication, a base station may schedule data more reliably by coordinating sidelink transmissions across multiple UEs, which may increase data throughput and improve latency by reducing dropped or failed transmissions.

One or more aspects of the disclosure are initially described in the context of wireless communications systems. One or more aspects of the disclosure are further illustrated by and described with reference to transmission schemes, a process flow, apparatus diagrams, system diagrams, and flowcharts that relate to techniques for indicating a sidelink receiver.

Figure 1:
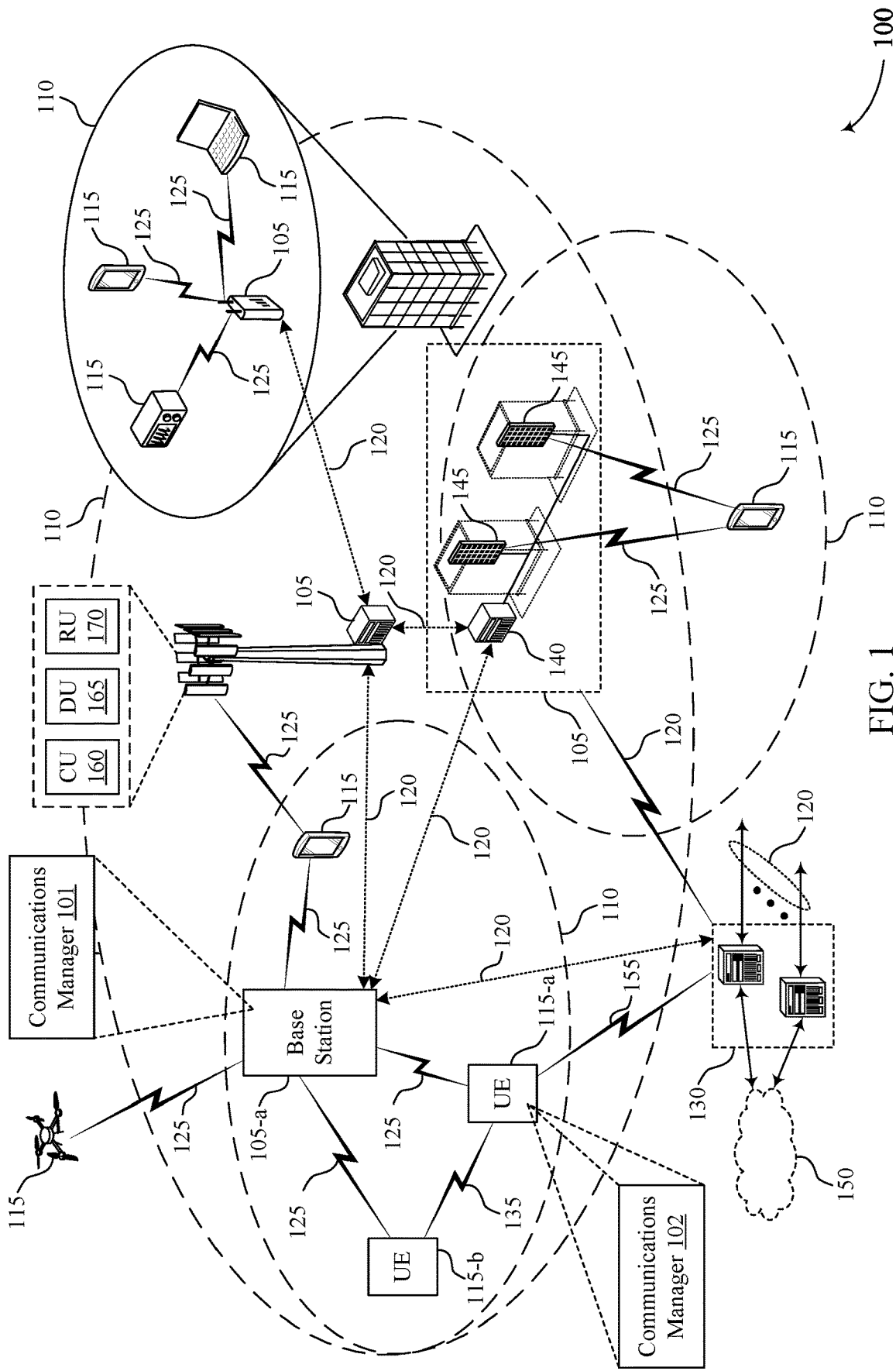
FIG. 1 illustrates an example of a wireless communications system that supports techniques for indicating a sidelink receiver in accordance with one or more aspects of the present disclosure.

FIG. 1 illustrates an example of a wireless communications system 100 that supports techniques for indicating a sidelink receiver in accordance with one or more aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. A UE 115 may communicate with the core network 130 through a communication link 155.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and base stations 105. In such cases, the disaggregated UE 115 may include the respective physical devices configured to perform various functions and communications, for example to perform one or more of the signaling and power control techniques for RF sensing procedures described herein.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of TS=1/ ($\Delta f_{max}$-$N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 4G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 4G NR two initial operating bands have been identified as frequency range designations FR1 (410 MHz-7.125 GHz) and FR2 (24.25 GHz-42.6 GHz). It should be understood that, although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 4G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 4G NR operation beyond 42.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 4 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to being carried out between UEs 115 and base stations 105, may be implemented via additional or alternative wireless devices, including distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 170 is flexible and as such gives rise to numerous permutations of different functionalities depending upon which functions (e.g., MAC functions, baseband functions, radio frequency functions, and any combinations thereof) are performed at the CU 160, DU 165, and RU 170. For example, a functional split of the protocol stack may be employed between a DU 165 and an RU 170 such that the DU 165 may support one or more layers of the protocol stack and the RU 170 may support one or more different layers of the protocol stack.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In accordance with one or more aspects of the present disclosure, the wireless communications system 100 may support techniques for scheduling sidelink communications (e.g., via a D2D communication link 135). For example, a base station 105 may transmit a grant (e.g., in a DCI message) to a first UE 115 that indicates a resource allocation for a sidelink communication, either from the first UE 115 to a second UE 115 or from the second UE 115 to the first UE 115. The grant may include a destination identifier associated with the sidelink communication, as well as a mapping between the resource allocation and the destination identifier. The destination identifier may be based on information in an indication received from the first UE 115. For example, the destination identifier may be indexed to an entry in a buffer status report by indicating a buffer size value associated with the second UE 115. Additionally or alternatively, the grant may identify the second UE 115 using a process number (e.g., a HARQ process number), a Layer 1 identifier, a Layer 2 identifier, a resource pool index, a CRC scrambling sequence, an index of a CCE in which the grant is transmitted, a configuration for a monitoring occasion (e.g., a configuration for a search space occasion), or any combination thereof. In some examples, the base station 105 may configure a default receiver UE 115 for transmissions from the first UE 115, and the base station 105 may identify a receiver UE 115 in the grant if the intended receiver UE 115 is different than the default receiver UE 115.

In some examples, a base station 105-*a* may include a communications manager 101 that is configured to support one or more aspects of the techniques for indicating a sidelink receiver described herein. For example, the communications manager 101 may support the base station 105-*a* receiving (e.g., from a UE 115-*a*) an indication of a sidelink communication, the indication including a destination identifier associated with a UE 115-*b*. In some examples, the communications manager 101 may be configured to support the base station 105-*a* transmitting (e.g., to the UE 115-*a*) a grant in response to the indication, the grant indicating a mapping between a resource allocation and the destination identifier associated with the UE 115-*b*. In some examples, the communications manager 101 may be configured to support the base station 105-*a* monitoring for a feedback message associated with a sidelink signal that is communicated with the second UE according to the resource allocation.

In some examples, the UE 115-*a* may include a communications manager 102 that is configured to support one or more aspects of the techniques for indicating a sidelink receiver described herein. For example, the communications manager 102 may be configured to support the UE 115-*a* transmitting (e.g., to the base station 105-*a*) an indication of a sidelink communication, the indication comprising a destination identifier associated with the UE 115-*b*. In some examples, the communications manager 102 may be configured to support the UE 115-*a* receiving a grant in response to the indication, the grant indicating a mapping between a resource allocation and the destination identifier associated with the UE 115-*b*. In some examples, the communications manager 102 may be configured to support the UE 115-*a* communicating, in response to receiving the grant, a sidelink signal with the UE 115-*b* according to the resource allocation.

Figure 2A:
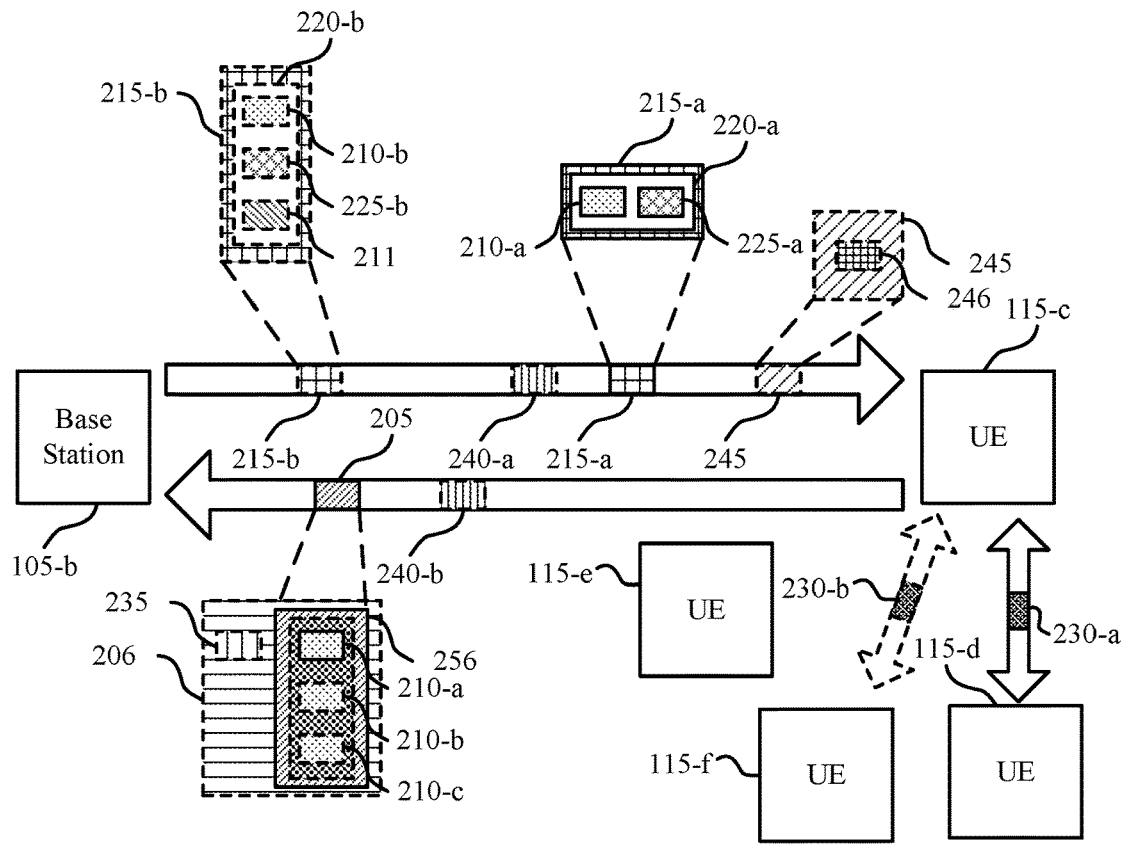
FIG. 2A illustrates an example of a wireless communications system that supports techniques for indicating a sidelink receiver in accordance with one or more aspects of the present disclosure.

FIG. 2A illustrates an example of a wireless communications system 200 that supports techniques for indicating a sidelink receiver in accordance with one or more aspects of the present disclosure. In some examples, the wireless communications system 200 may implement aspects of the wireless communications system 100. For example, the wireless communications system 200 may include a base station 105-*b* and one or more UEs 115, which may be examples of corresponding devices described with reference to FIG. 1. The wireless communications system 200 may include features for improved communications between the base station 105-*b* and the UEs 115, among other benefits.

The base station 105-*b* and the UEs 115 may communicate via one or more channels. For example, a UE 115-*c* may communicate via sidelink channels with UEs 115-*d*, 115-*e*, and 115-*f* over a sidelink interface, which may be referred to as a PC5 interface. The base station 105-*b* may schedule transmission of sidelink signals 230 according to a centralized resource allocation mode, which may be referred to as Mode 1. The base station 105-*b* may transmit a grant 215 scheduling a transmission of a sidelink signal 230 in a resource allocation 225. For example, a grant 215-*a* may schedule the UE 115-*c* to communicate (e.g., transmit or receive) a sidelink signal 230-*a* in a resource allocation 225-*a*.

In some cases, the base station 105-*c* may transmit the grant 215-*a* in a control signal, such as a DCI message. The DCI message may have an associated format, such as Format 3_0. The DCI message may contain one or more bits (e.g., in a field sl-TxPoolScheduling) identifying a resource pool index, one or more bits (e.g., 3 bits in a field sl-DCI-ToSL-Trans) identifying a time gap between the grant 215-*a* and the resource allocation 225-*a*, one or more bits identifying a process number 235 (e.g., a HARQ process number that includes 4 bits, where the HARQ process number may be associated with a DCI message, a sidelink control information (SCI) message, or both), a bit that includes a new data indicator (NDI), a subcarrier index (e.g., a lowest subcarrier index) associated with the resource allocation 225-*a*, one or more format fields (e.g., a time domain resource allocation (TDRA), a frequency domain resource allocation (FDRA), or both) of an SCI message (e.g., an SCI-1-A message), an indication of a feedback timing (e.g., a physical sidelink feedback channel (PSFCH) to HARQ feedback timing in a field sl-PSFCH-ToPUCCH), one or more bits (e.g., 3 bits) identifying a physical uplink control channel (PUCCH) resource indicator, a configuration index (e.g., zero bits if the UE 115-*c* is configured for direct grant (DG) monitoring, or 3 bits otherwise), one or more bits (e.g., 2 bits) identifying a sidelink assignment index (SAI), one or more padding bits, or any combination thereof.

In some examples, the DCI message may indicate the resource allocation 225-*a* for a transport block (TB) or a resource allocation 225 for a retransmission of a TB. The UE 115-*c* may maintain a mapping 220 (e.g., a one-to-one mapping) of HARQ process numbers in DCI messages and HARQ process numbers in SCI messages for the TB. In some examples, the base station 105-*b* may include the NDI in the DCI message to toggle an NDI in an SCI message. In some examples, the NDI may configure the UE 115-*c* to drop a retransmission of a TB (e.g., the base station 105-*b* may configure a maximum quantity of retransmissions in Mode 1 sidelink communications). Additionally or alternatively, the base station 105-*b* may configure (e.g., using RRC signaling) a range of modulation and coding scheme (MCS) values. The UE 115-*c* may select an MCS value from the configured range for use in transmitting the TB. In some cases, the UE 115-*c* may determine which TB to transmit in the resource allocation 225-*a*, as well as a target UE 115 for the TB, whether to enable or disable sidelink feedback (e.g., HARQ feedback) for the TB, a process number 235 for the TB, a reference signal pattern (e.g., a demodulation reference signal (DMRS) pattern), one or more reference signal ports, a quantity of layers, a precoding scheme, a channel state information (CSI) reference signal (CSI-RS) pattern, a redundancy version identifier, a cast type, or any combination thereof.

Data transmission reliability may be improved by enabling the base station 105-*b* to indicate a receiver UE 115 for the sidelink signal 230-*a* in the 215-*a*, for example to improve interference management for the resource allocation 225-*a*. For example, in FR1, if the base station 105-*b* configures a transmit power of the sidelink signal toward the receiver UE 115, the base station 105-*b* may reuse spatial resources for additional transmissions, which may increase data throughput. In FR2, if the base station 105-*b* configures a beam direction to the receiver UE 115, the UE 115-*c* may be able to increase antenna gains for transmitting the sidelink signal 230-*a*. Additionally or alternatively, if the base station 105-*b* indicates the receiver UE 115, the base station 105-*b* may more reliably configure the UE 115-*c* to use the resource allocation 225-*a* for multiple TBs, or otherwise improve communications reliability.

In accordance with one or more aspects of the present disclosure, the base station 105 may transmit the grant 215-*a* (e.g., in a DCI message) to the UE 115-*c* that indicates the resource allocation 225-*a* for transmitting the sidelink signal 230-*a*, either from the UE 115-*c* to the UE 115-*d* or from the UE 115-*d* to the UE 115-*c*. The grant 215-*a* may include a destination identifier 210-*a* associated with the UE 115-*d*, as well as a mapping 220-*a* between the resource allocation 225-*a* and the destination identifier 210-*a*.

In some examples, the destination identifier 210-*a* may include a buffer size identifier associated with the UE 115-*d*, which may index the resource allocation 225-*a* to an entry in a buffer status report 256, which the UE 115-*c* may include in the indication 205. A quantity of bits indicating the buffer size identifier may be configurable. For example, if the buffer size identifier is zero bits, the buffer size identifier may indicate the resource allocation 225-*a* is for a first entry in the buffer status report 256. In some examples, the indication 205 may include a set of destination identifiers 210 as entries in the buffer status report 256, which may be sorted based on a priority or a packet delay budget in descending order. In some examples, the order of a first quantity of entries in the buffer status report 256 may be the same across different process numbers 235. For example, the UE 115-*c* may maintain one or more orders of the entries in the buffer status report 256, which may be shared by one or more process numbers 235.

In some examples, the UE 115-*c* may set a corresponding buffer size identifier to zero when the UE 115-*c* receives a grant 215 indicating a destination identifier 210. The UE 115-*c* may remove entries with a zero buffer size from the buffer status report 256 and reorder the entries of the buffer status report 256 after receiving an indication of successful decoding at the base station 105-*b*, for example in a feedback message 240-*a* from the base station 105-*b*. Additionally or alternatively, the UE 115-*c* may reorder the entries of the buffer status report 256 (e.g., based on a priority or a packet delay budget) after a timer expires at the UE 115-*c*.

In some examples, the base station 105-*b* may transmit a grant 215-*b* that indicates a resource allocation 225-*b* for transmitting a sidelink signal 230-*b* from the UE 115-*c* to the UE 115-*e*. The grant 215-*b* may include a destination identifier 210-*b* associated with the UE 115-*e*, as well as a mapping 220-*b* between the resource allocation 225-*b* and the destination identifier 210-*b*. The destination identifier 210-*b* may correspond to an entry with a zero buffer size in the buffer status report 256. Based on the zero buffer size, the UE 115-*c* may instead transmit the sidelink signal 230-*b* to the UE 115-*f*. In some examples, the UE 115-*f* may be associated with a destination identifier 210-*c*, which may have an index greater than or less than a destination identifier index 211 associated with the destination identifier 210-*b*.

In some examples, the UE 115-*c* may transmit the indication 205 in an uplink transmission 206, which may be associated with a process number 235 (e.g., a HARQ process number). The base station 105-b may include one or more bits of the process number 235 in the grant 215-a to indicate the destination identifier 210-a. For example, the base station 105-c may partition the process number 235 according to the different receiver UEs 115. In some examples, the one or more bits of the process number 235 may include a least significant bit (LSB) or a most significant bit (MSB) of the process number 235 to identify the receiver UE 115. In some examples, the UE 115-c may be a programmable logic controller (PLC) or a customer premise equipment (CPE) configured to support a relatively large quantity of HARQ processes to serve receiver UEs 115. A receiver UE 115 may be associated with process numbers 235 that satisfy the formula:

$$HPN = \left(RxIDHPNOffset + \text{floor}\left(\frac{TotalHPN}{NrHPNPerRx}\right) * i\right) \bmod TotalHPN, \quad (1)$$

where i=0, . . . , NrHPNPerRx−1. HPN may refer to any process number 235 that satisfies Equation 1, RxIDHPNOffset may be an offset, TotalHPN may be the quantity of available process numbers 235, and NrHPNPerRx may be a quantity of process numbers 235 per receiver UE 115. In some examples, different receiver UEs 115 may be associated with different respective quantities of HARQ processes, for example based on a traffic profile, a UE capability, or both, associated with each receiver UE 115.

In some examples, the base station 105-b may transmit control signaling 245 (e.g., a MAC control element (MAC-CE) or RRC signaling) indicating an association 246, and the grant 215-a may indicate the mapping 220-a between the resource allocation 225-a and the destination identifier 210-a in accordance with the association 246. In some examples, the association 246 may associate a grant 215 with a default destination identifier 210 (e.g., the destination identifier 210-a). For example, the UE 115-c may be a sensor/actuator (S/A) configured to transmit to a PLC by default. In some examples, the base station 105-b may transmit the control signaling 245 to adjust the default destination identifier, such as to schedule a transmission to another receiver UE 115 other than the previous default PLC. In some examples, the base station 105-b may transmit the control signaling 245 in a physical downlink shared channel (PDSCH).

In some examples, the destination identifier 210-a may include a CCE index corresponding to a CCE in which the grant 215-a is received. For example, the CCE index may indicate one or more bits of the destination identifier 210-a. Additionally or alternatively, the UE 115-c may receive the grant 215-a in a monitoring occasion (e.g., in a search space), and the destination identifier 210-a may include a configuration of the monitoring occasion associated with the UE 115-d.

In some examples, the base station 105-b may reserve one or more destination identifiers 210 as "wild card" destination identifiers, which may indicate to the UE 115-c that the UE 115-c may autonomously select a receiver UE 115 to transmit to in the associated resource allocation 225. The base station 105-b may configure one or more constraints for selecting the receiver UE 115, where the one or more constraints may include a beam direction, a slot index, a transmit power parameter, or any combination thereof. In some examples, the UE 115-c may be configured to ignore the destination identifier 210 included in a grant 215 based on one or more conditions. For example, a priority level of another TB may exceed a threshold. In some examples, the UE 115-c may report the preemption of the TB to the base station 105-b, for example in a feedback message 240-b.

Figure 2B:
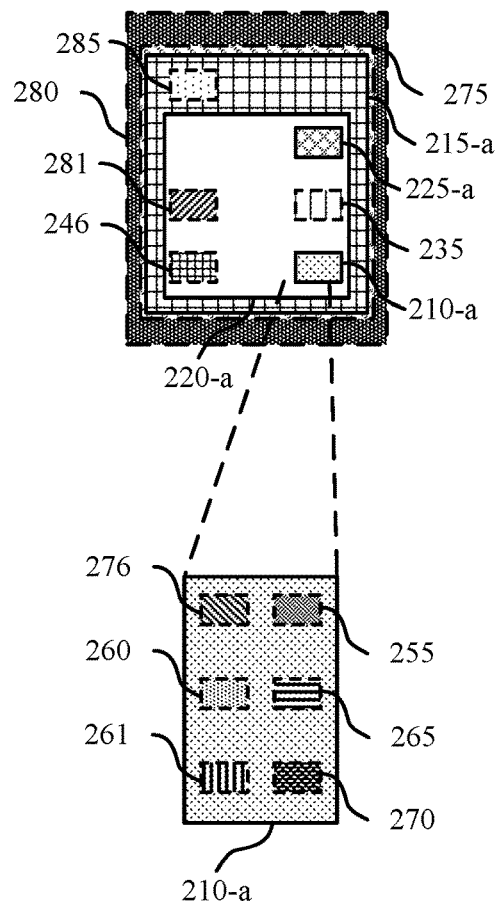
FIG. 2B illustrates an example of a grant that supports techniques for indicating a sidelink receiver in accordance with one or more aspects of the present disclosure.

FIG. 2B illustrates an example of a grant 215-a that supports techniques for indicating a sidelink receiver in accordance with one or more aspects of the present disclosure. In some examples, the grant 215-a may implement one or more aspects of the wireless communications system 100 or the wireless communications system 200. For example, the grant 215-a may be an example of communication between a first UE and a base station, which may be examples of corresponding devices described with reference to FIGS. 1 and 2A.

The base station may transmit the grant 215-a (e.g., in a DCI message) scheduling the first UE to communicate (e.g., transmit or receive) a sidelink signal with a second UE in a resource allocation 225-a. The grant 215-a may include a destination identifier 210-a associated with the second UE, as well as a mapping 220-a between the resource allocation 225-a and the destination identifier 210-a. In some examples, the base station may further indicate one or more parameters for transmitting the sidelink signal, including an MCS value, a redundancy version, a reference signal pattern, a reference signal port, a feedback configuration, a cast type 285 (e.g., unicast, groupcast, or broadcast), or any combination thereof. Additionally or alternatively, the base station may configure the first UE to populate a process number 235 in the grant 215-a to an SCI message.

In some examples, the destination identifier 210-a may include a buffer size identifier 255 associated with the second UE, which may index the resource allocation 225-a to an entry in a buffer status report, which the first UE may include in an indication. A quantity of bits indicating the buffer size identifier 255 may be configurable. For example, if the buffer size identifier 255 is zero bits, the buffer size identifier 255 may indicate the resource allocation 225-a is for a first entry in the buffer status report.

In some examples, the destination identifier 210-a may include one or more bits of a Layer 1 identifier 260, a Layer 2 identifier 261, or both, associated with the second UE. For example, the second UE may be associated with a 16-bit Layer 1 identifier 260 and a 24-bit Layer 2 identifier 261, and the destination identifier 210-a may include a portion of either identifier that identifies the second UE.

In some examples, the destination identifier 210-a may include a resource pool index 265 associated with the second UE. For example, the base station 105-b may configure the resource pool index 265 (e.g., a virtual resource pool index) in the DCI message, where multiple receiver UEs may share a same physical resource pool. In some examples, an association 246 in control signaling may associate the resource pool index 265 with the destination identifier 210-a. For example, RRC signaling may configure different tables mapping the receiver UEs to resource pool indices 265, and a MAC-CE may activate one or more of the tables.

In some examples, the destination identifier 210-a may include a CRC scrambling sequence 270 associated with the second UE, such as a radio network temporary identifier (RNTI) scrambling the CRC of the DCI message. For example, the base station may configure a respective CRC scrambling sequence 270 that corresponds to each receiver UE. In some examples, the base station may expand the RNTI for the DCI message to include the destination identifier 210-a.

In some examples, the destination identifier 210-a may include a CCE index 276 corresponding to a CCE 275 in which the grant 215-*a* is received. For example, the CCE index 276 may indicate one or more bits of the destination identifier 210-*a*. Additionally or alternatively, the first UE may receive the grant 215-*a* in a monitoring occasion 280 (e.g., in a search space), and the destination identifier 210-*a* may include a configuration 281 of the monitoring occasion 280 associated with the second UE.

Figure 3:
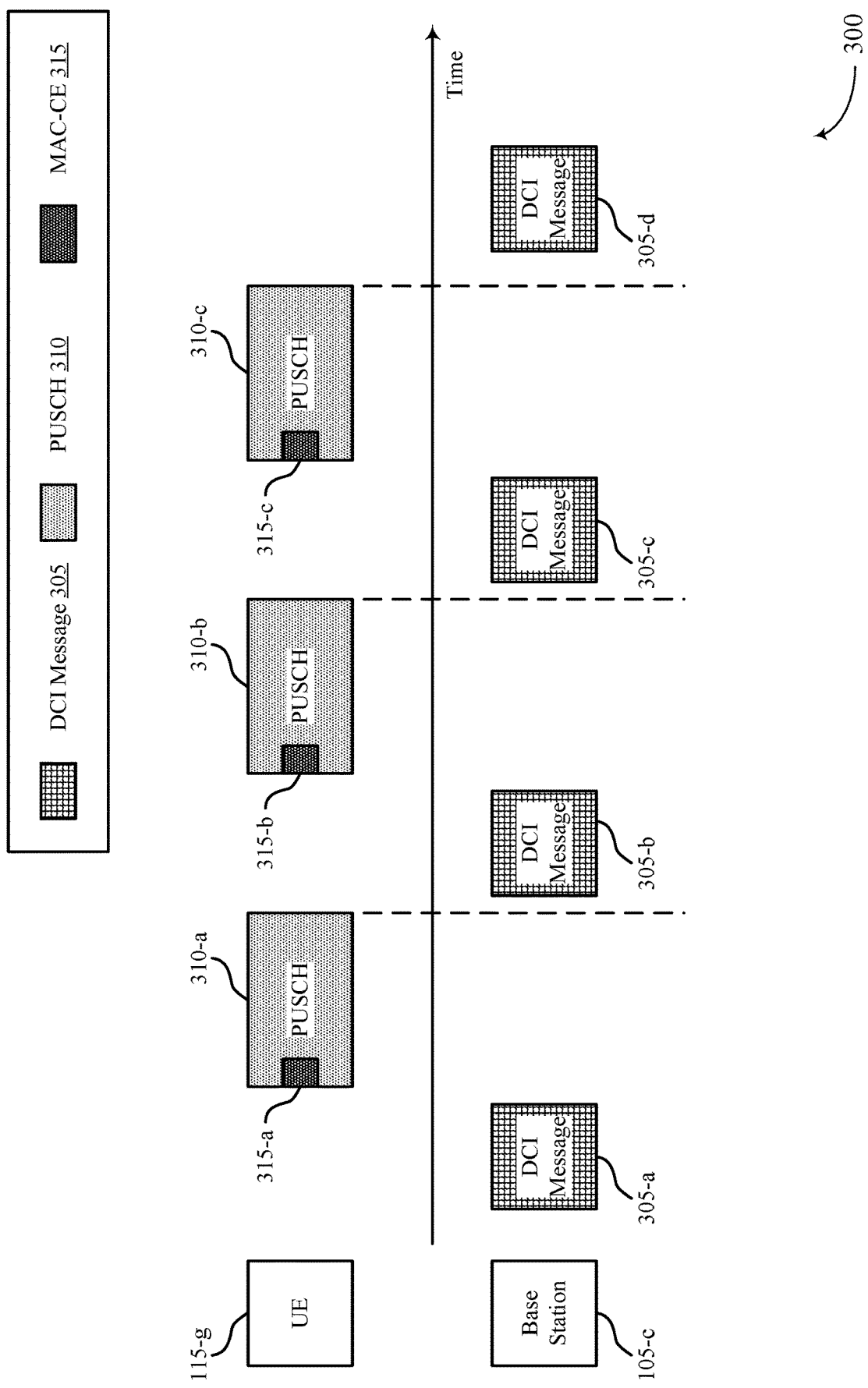
FIG. 3 illustrates an example of a transmission scheme that supports techniques for indicating a sidelink receiver in accordance with one or more aspects of the present disclosure.

FIG. 3 illustrates an example of a transmission scheme 300 that supports techniques for indicating a sidelink receiver in accordance with one or more aspects of the present disclosure. In some examples, the transmission scheme 300 may implement one or more aspects of the wireless communications system 100 or the wireless communications system 200. For example, the transmission scheme 300 may illustrate communication between a UE 115-*g* and a base station 105-*c*, which may be examples of corresponding devices described with reference to FIGS. 1 and 2A. The transmission scheme 300 may include features for improved communication reliability, among other benefits.

The base station 105-*c* may transmit DCI messages 305 scheduling transmissions from the UE 115-*g*, including a physical uplink shared channel (PUSCH) 310. The base station 105-*c* may additionally transmit the DCI messages 305 to schedule sidelink communications between the UE 115-*g* and one or more additional UEs 115. For example, the UE 115-*g* may include an indication of a sidelink communication in a MAC-CE 315, which the UE 115-*g* may transmit to the base station 105-*c* in a PUSCH 310. Each PUSCH 310 may be associated with a process number (e.g., a HARQ process number). In some examples, the MAC-CE 315 may include a buffer status report, which may include one or more entries. Each entry may include a destination identifier identifying a receiver UE 115 for which the UE 115-*g* has data to transmit. Each entry may further include a buffer size identifier that indicates a size of the data to transmit.

In accordance with one or more aspects of the present disclosure, the base station 105-*c* may transmit a DCI message 305-*a* scheduling the UE 115-*g* to transmit a PUSCH 310-*a*, where the PUSCH 310-*a* may include a first process number. Subsequently, the base station 105-*c* may transmit a DCI message 305-*b* scheduling a PUSCH 310-*b*, where the PUSCH 310-*b* may include a second process number. The base station 105-*c* may further transmit a DCI message 305-*c* scheduling a PUSCH 310-*c*, where the PUSCH 310-*c* may include the first process number. In some examples, the DCI message 305-*c* may provide feedback (e.g., in a dynamic field indicator (DFI)) associated with the PUSCH 310-*a*. The UE 115-*g* may transmit a MAC-CE 315-*c* in the PUSCH 310-*c*, where the MAC-CE 315-*c* may indicate a sidelink communication and include a destination identifier associated with a receiver UE 115 for the sidelink communication. In some examples, the UE 115-*g* may reuse the first process number to toggle an NDI and indicate the sidelink communication. Based on the indication in the MAC-CE 315-*c*, the base station 105-*c* may transmit a DCI message 305-*d*, where the DCI message 305-*d* may include a grant indicating a mapping between a resource allocation and the destination identifier associated with the receiver UE 115. Based on the grant, the UE 115-*g* may communicate (e.g., transmit or receive) a sidelink signal in the resource allocation.

Figure 4:
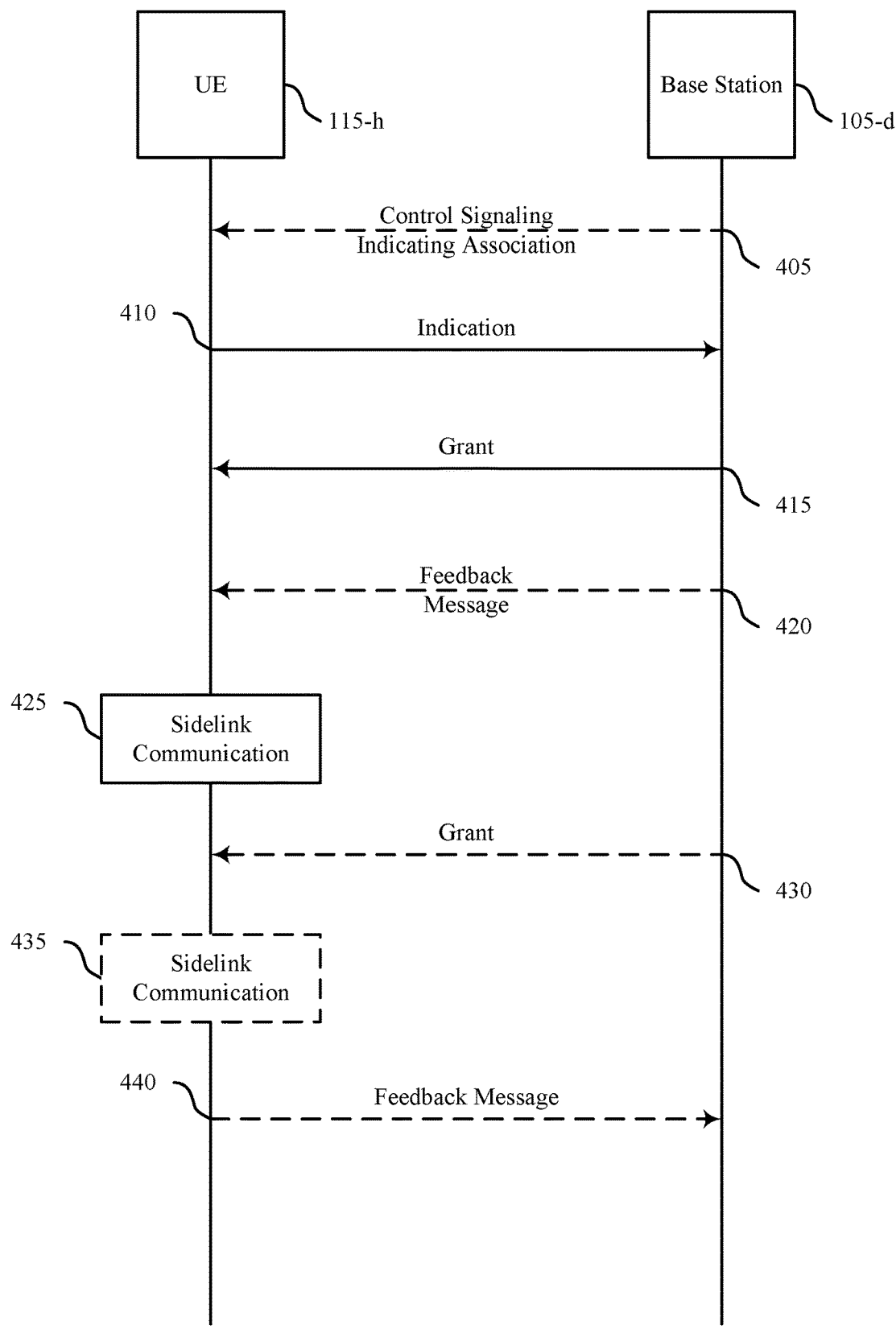
FIG. 4 illustrates an example of a process flow that supports techniques for indicating a sidelink receiver in accordance with one or more aspects of the present disclosure.

FIG. 4 illustrates an example of a process flow 400 that supports techniques for indicating a sidelink receiver in accordance with one or more aspects of the present disclosure. In some examples, the process flow 400 may implement one or more aspects of the wireless communications system 100 or the wireless communications system 200. For example, the process flow 400 may include example operations associated with a UE 115-*h* or a base station 105-*d*, which may be examples of corresponding devices described with reference to FIGS. 1 and 2A. In the following description of the process flow 400, the operations between the UE 115-*h* and the base station 105-*d* may be performed in a different order than the example order shown, or the operations performed by the UE 115-*h* and the base station 105-*d* may be performed in different orders or at different times. Some operations may also be omitted from the process flow 400, and other operations may be added to the process flow 400. The operations performed by the UE 115-*h* and the base station 105-*d* may support improvements to sidelink communication operations and, in some examples, may increase communications reliability, among other benefits.

In some examples, at 405 the base station 105-*d* may transmit control signaling to the UE 115-*h*. In some examples, the control signaling may indicate an association between a destination identifier and a process number associated with a sidelink communication. Additionally or alternatively, the control signaling may indicate an association between one or more sidelink transmissions and a second UE 115.

At 410, the UE 115-*h* may transmit an indication of the sidelink communication to the base station 105-*d*. The indication may include the destination identifier associated with the second UE 115. In some examples, the UE 115-*h* may transmit the indication in an uplink transmission, which may be associated with a process number (e.g., a HARQ process number). The process number associated with the uplink transmission may be the same as or different than the process number associated with the sidelink communication. In some examples, the UE 115-*h* may transmit a set of destination identifiers (e.g., including the destination identifier associated with the second UE 115) in the indication, where the set of destination identifiers may be ordered according to the process number associated with the uplink transmission. For example, the destination identifier may be indexed to an entry in a buffer status report by indicating a buffer size identifier associated with the second UE 115.

At 415, the base station 105-*d* may transmit a grant in response to the indication. The grant may indicate a mapping between a resource allocation and the destination identifier associated with the second UE 115. In some examples, the destination identifier may be the buffer size value associated with the second UE 115. Additionally or alternatively, the grant may identify the second UE 115 using the process number (e.g., a HARQ process number) associated with the sidelink communication, a Layer 1 identifier, a Layer 2 identifier, a resource pool index, a CRC scrambling sequence, or any combination thereof. In some examples, the mapping may correspond to the process number associated with the uplink transmission. The grant may include one or more bits of the process number associated with the uplink transmission. In some examples, the grant may indicate the mapping in accordance with the association between the destination identifier and the process number associated with the sidelink communication, or in accordance with the association between the one or more sidelink transmissions and the second UE 115. In some examples, the base station 105-*d* may transmit the grant in a CCE, and the grant may indicate the mapping in accordance with a CCE index. Additionally or alternatively, the base station 105-*d* may transmit the grant in a monitoring occasion, and the grant may indicate the mapping in accordance with a configuration (e.g., a search space configuration) of the monitoring occasion.

In some examples, at 420, the base station 105-d may transmit a feedback message including the process number associated with the uplink transmission. The base station 105-d may transmit the feedback message (e.g., a DFI) in a DCI message with the grant.

At 425, the UE 115-d may communicate a sidelink signal with the second UE 115 according the resource allocation indicated in the grant. In some examples, the UE 115-d may transmit the sidelink signal to the second UE 115. Alternatively, the UE 115-d may be configured to receive the sidelink signal from the second UE 115.

In some examples, at 430 the base station 105-d may transmit a second grant to the UE 115-d. The second grant may indicate a second mapping between a second resource allocation and a second destination identifier associated with a third UE 115. The set of destination identifiers in the indication may include the second destination identifier. In some examples, the UE 115-h may identify that the second destination identifier corresponds to a zero buffer size, which may indicate the UE 115-h has already transmitted the data associated with the second destination identifier.

In some examples, at 435 the UE 115-h may communicate a second sidelink signal with a fourth UE 115 (e.g., a UE 115 different than the UE 115 indicated in the grant). In some examples, an index corresponding to a third destination identifier associated with the fourth UE 115 may be greater than or less than an index corresponding to the second destination identifier associated with the third UE 115. Additionally or alternatively, at 440, the UE 115-h may transmit a feedback message to the base station 105-d based on the zero buffer size. For example, the UE 115-d may transmit an acknowledgment feedback message without retransmitting the data to the third UE 115. By implementing one or more of the described techniques, the UE 115-h may be able to transmit data in sidelink communications more efficiently, or in a manner that increases data throughput, or considers power consumption or processing load, among other considerations.

Figure 5:
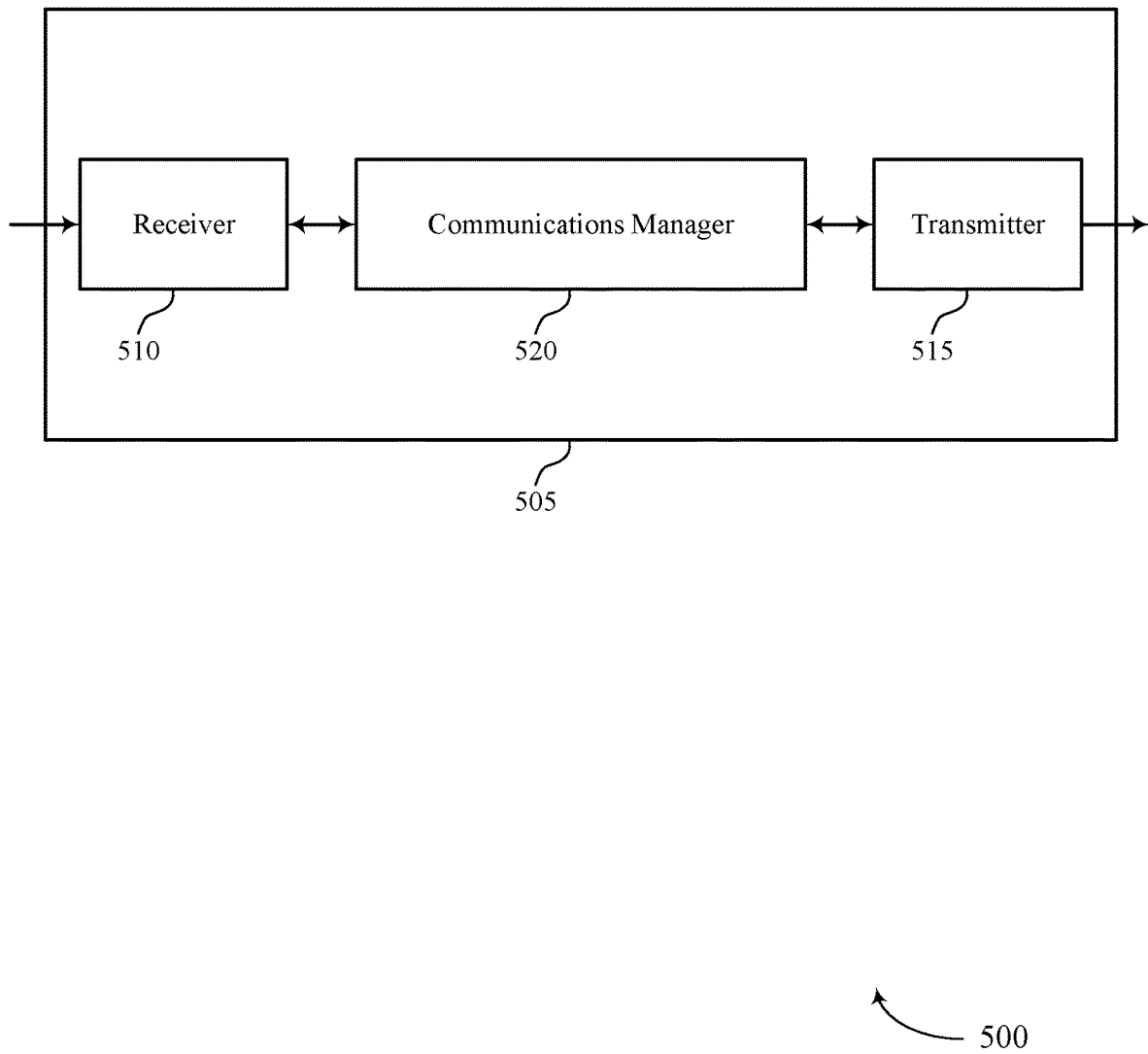
FIGS. 5 and 6 show block diagrams of devices that support techniques for indicating a sidelink receiver in accordance with one or more aspects of the present disclosure.

FIG. 5 shows a block diagram 500 of a device 505 that supports techniques for indicating a sidelink receiver in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for indicating a sidelink receiver). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for indicating a sidelink receiver). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for indicating a sidelink receiver as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for transmitting, to a base station, an indication of a sidelink communication, the indication including a destination identifier associated with a second UE. The communications manager 520 may be configured as or otherwise support a means for receiving a grant in response to the indication, the grant indicating a mapping between a resource allocation and the destination identifier associated with the second UE. The communications manager 520 may be configured as or otherwise support a means for communicating, in response to receiving the grant, a sidelink signal with the second UE according to the resource allocation.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improving transmission reliability. In some aspects, the processor of the device 505 may process sidelink communications according to the grant from the base station. For example, the processor of the device 505 may turn on one or more processing units for processing the grant, increase a processing clock, or a similar mechanism within the device 505. As such, when subsequent grants are received, the processor may more reliably communicate in sidelink communications. Improvements in sidelink communications may result in improvements in power saving and communications reliability, which may further increase power efficiency at the device 505 (e.g., by eliminating unnecessary data retransmissions).

Figure 6:
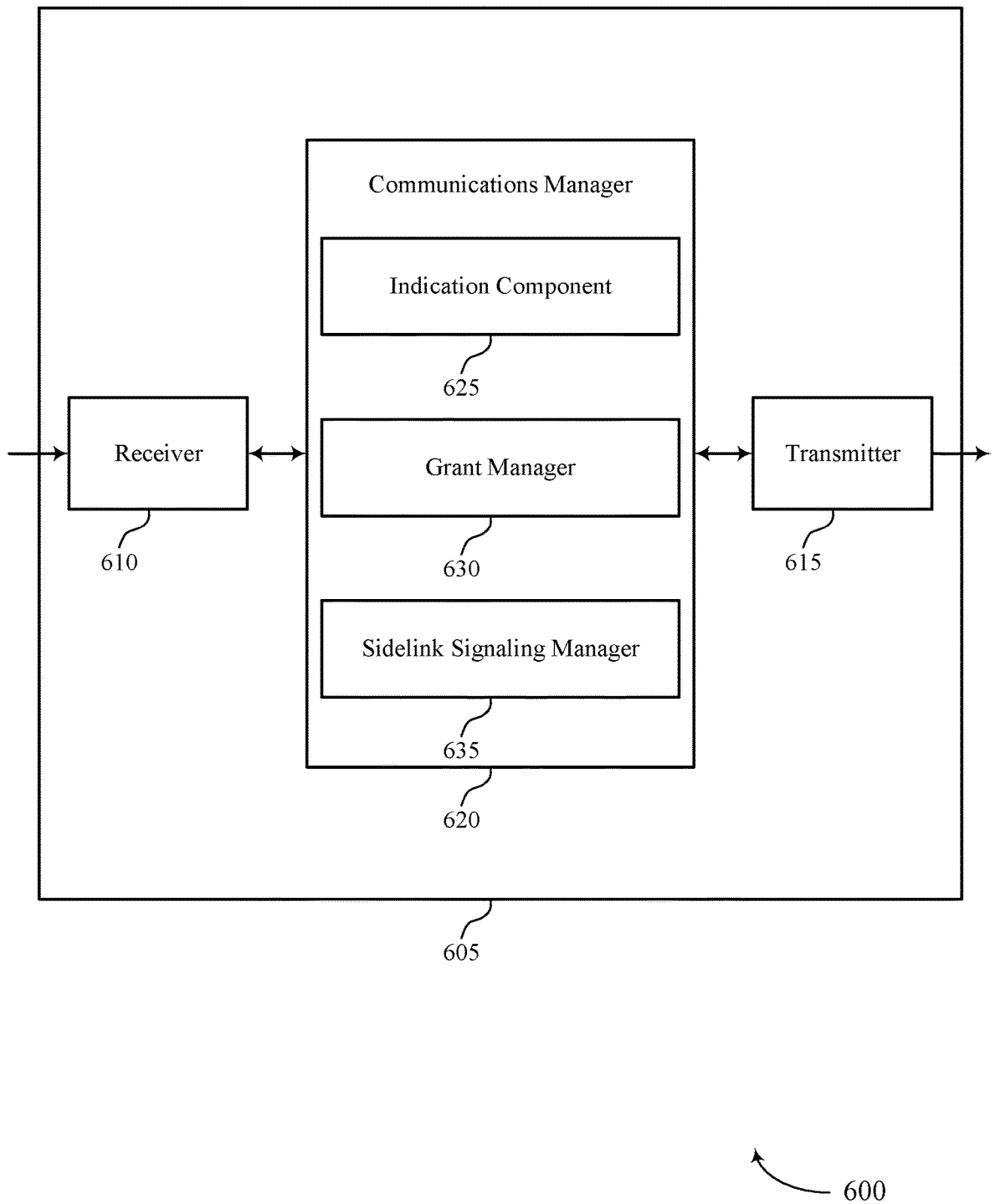

FIG. 6 shows a block diagram 600 of a device 605 that supports techniques for indicating a sidelink receiver in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for indicating a sidelink receiver). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for indicating a sidelink receiver). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for indicating a sidelink receiver as described herein. For example, the communications manager 620 may include an indication component 625, a grant manager 630, a sidelink signaling manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The indication component 625 may be configured as or otherwise support a means for transmitting, to a base station, an indication of a sidelink communication, the indication including a destination identifier associated with a second UE. The grant manager 630 may be configured as or otherwise support a means for receiving a grant in response to the indication, the grant indicating a mapping between a resource allocation and the destination identifier associated with the second UE. The sidelink signaling manager 635 may be configured as or otherwise support a means for communicating, in response to receiving the grant, a sidelink signal with the second UE according to the resource allocation.

Figure 7:
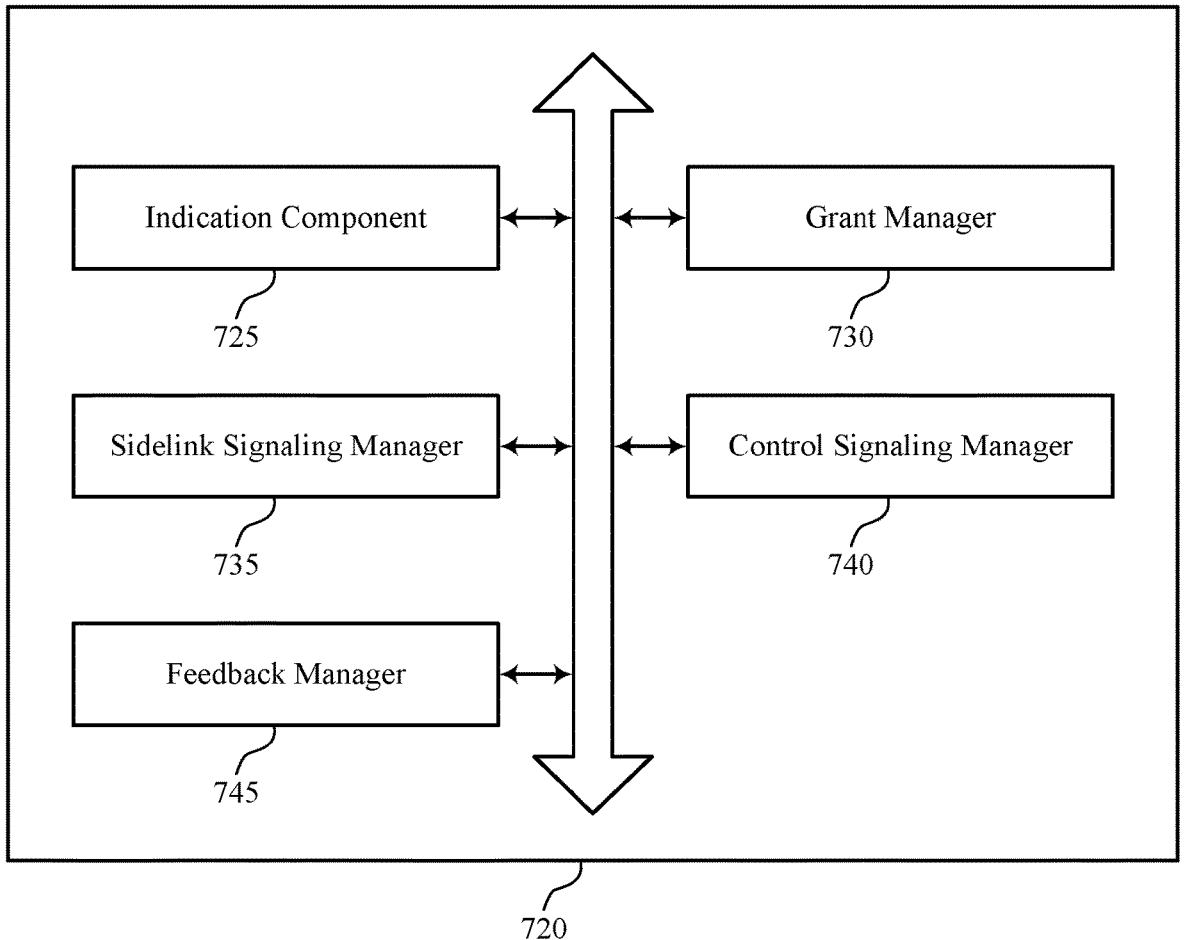
FIG. 7 shows a block diagram of a communications manager that supports techniques for indicating a sidelink receiver in accordance with one or more aspects of the present disclosure.

FIG. 7 shows a block diagram 700 of a communications manager 720 that supports techniques for indicating a sidelink receiver in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for indicating a sidelink receiver as described herein. For example, the communications manager 720 may include an indication component 725, a grant manager 730, a sidelink signaling manager 735, a control signaling manager 740, a feedback manager 745, or any combination thereof. Each of these components may communicate, directly or indirectly, with one another (e.g., via one or more buses).

The communications manager 720 may support wireless communication at a first UE in accordance with examples as disclosed herein. The indication component 725 may be configured as or otherwise support a means for transmitting, to a base station, an indication of a sidelink communication, the indication including a destination identifier associated with a second UE. The grant manager 730 may be configured as or otherwise support a means for receiving a grant in response to the indication, the grant indicating a mapping between a resource allocation and the destination identifier associated with the second UE. The sidelink signaling manager 735 may be configured as or otherwise support a means for communicating, in response to receiving the grant, a sidelink signal with the second UE according to the resource allocation.

In some examples, to support transmitting the indication, the indication component 725 may be configured as or otherwise support a means for transmitting the indication in an uplink transmission associated with a process number, where the mapping indicated in the grant corresponds to the process number.

In some examples, the feedback manager 745 may be configured as or otherwise support a means for receiving, prior to communicating the sidelink signal, a feedback message from the base station, the feedback message including the process number.

In some examples, the grant includes one or more bits of the process number.

In some examples, to support transmitting the indication, the indication component 725 may be configured as or otherwise support a means for transmitting, in the indication, a set of destination identifiers that is ordered according to the process number, the set of destination identifiers including the destination identifier associated with the second UE.

In some examples, the control signaling manager 740 may be configured as or otherwise support a means for receiving control signaling indicating an association between the destination identifier and a process number associated with the sidelink communication, where the grant indicates the mapping in accordance with the association.

In some examples, the grant manager 730 may be configured as or otherwise support a means for receiving a second grant in response to the indication, the second grant indicating a second mapping between a second resource allocation and a second destination identifier associated with a third UE, where the indication includes the second destination identifier associated with the third UE, and where the second destination identifier corresponds to a zero buffer size.

In some examples, the feedback manager 745 may be configured as or otherwise support a means for transmitting, in response to the second grant, a feedback message to the base station based on the zero buffer size.

In some examples, the sidelink signaling manager 735 may be configured as or otherwise support a means for transmitting, in response to the second grant, a second sidelink signal to a fourth UE according to the second resource allocation.

In some examples, an index corresponding to a third destination identifier associated with the fourth UE is greater than an index corresponding to the second destination identifier associated with the third UE.

In some examples, an index corresponding to a third destination identifier associated with the fourth UE is less than an index corresponding to the second destination identifier associated with the third UE.

In some examples, the destination identifier includes a buffer size identifier associated with the second UE. In some examples, the buffer size identifier is transmitted in a buffer status report.

In some examples, the destination identifier includes a layer 1 identifier, a layer 2 identifier, or both, associated with the second UE.

In some examples, the control signaling manager 740 may be configured as or otherwise support a means for receiving control signaling indicating an association between one or more sidelink transmissions and the second UE, where the grant indicates the mapping in accordance with the association.

In some examples, the destination identifier includes a resource pool index associated with the second UE.

In some examples, the destination identifier includes a cyclic redundancy check scrambling sequence associated with the second UE.

In some examples, the grant is received in a control channel element. In some examples, the grant indicates the mapping in accordance with an index of the control channel element.

In some examples, the grant is received in a monitoring occasion. In some examples, the grant indicates the mapping in accordance with a configuration of the monitoring occasion.

In some examples, the grant further indicates a cast type associated with communicating the sidelink signal.

In some examples, to support communicating the sidelink signal, the sidelink signaling manager 735 may be configured as or otherwise support a means for transmitting, in response to receiving the grant, the sidelink signal to the second UE according to the resource allocation.

In some examples, to support communicating the sidelink signal, the sidelink signaling manager 735 may be configured as or otherwise support a means for receiving, in response to receiving the grant, the sidelink signal from the second UE according to the resource allocation.

Figure 8:
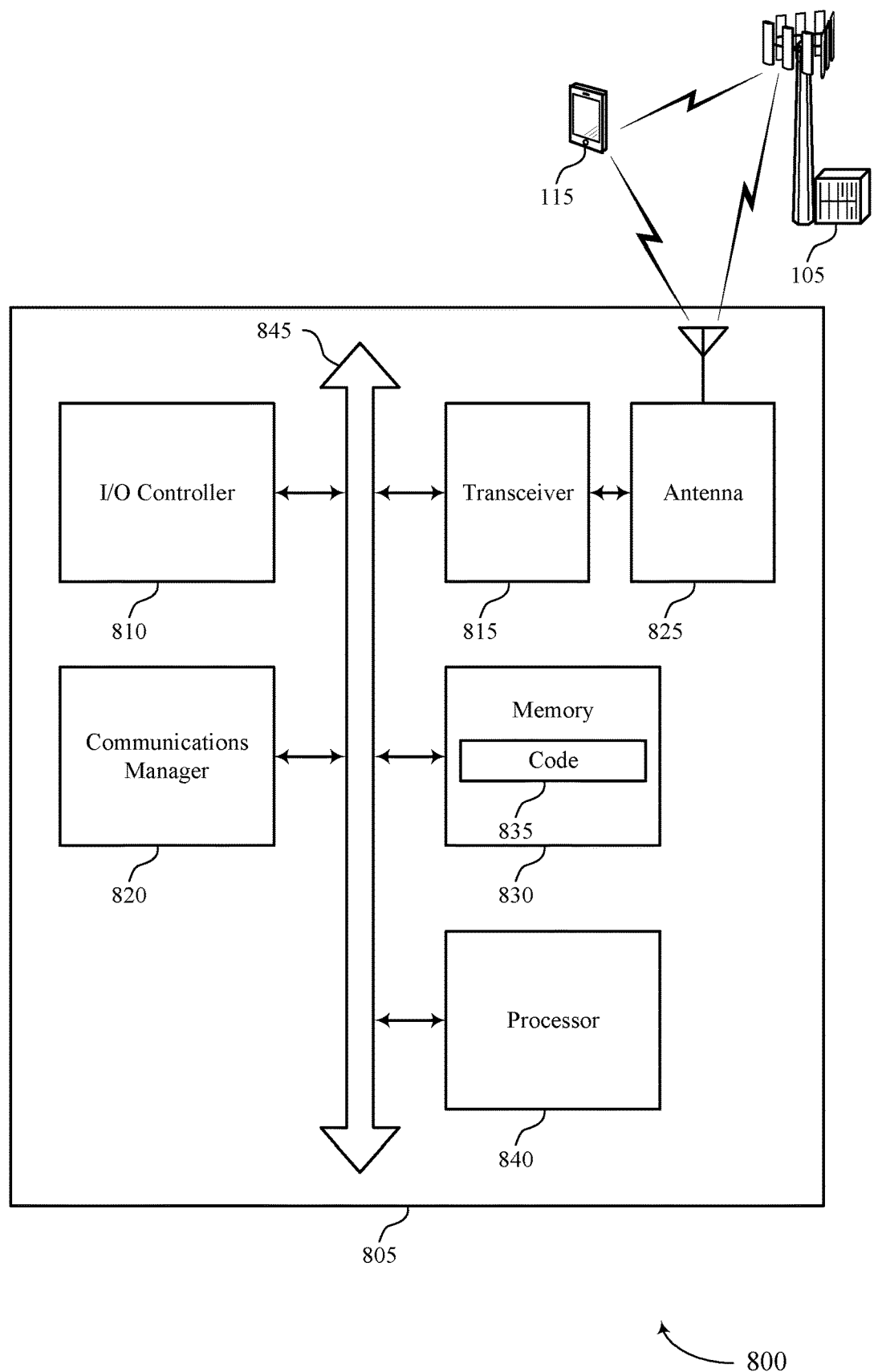
FIG. 8 shows a diagram of a system including a device that supports techniques for indicating a sidelink receiver in accordance with one or more aspects of the present disclosure.

FIG. 8 shows a diagram of a system 800 including a device 805 that supports techniques for indicating a sidelink receiver in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for indicating a sidelink receiver). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for transmitting, to a base station, an indication of a sidelink communication, the indication including a destination identifier associated with a second UE. The communications manager 820 may be configured as or otherwise support a means for receiving a grant in response to the indication, the grant indicating a mapping between a resource allocation and the destination identifier associated with the second UE. The communications manager 820 may be configured as or otherwise support a means for communicating, in response to receiving the grant, a sidelink signal with the second UE according to the resource allocation.

By including or configuring the communications manager 820 in accordance with examples as described herein, the device 805 may support techniques for saving power by communicating with other devices (e.g., a UE 115 or a base station 105 as shown in FIG. 1) in communications more efficiently. For example, the device 805 may improve reliability in communications with other devices, as the device 805 may be able to communicate via a sidelink connection according to the grant. Using the techniques described herein, the device 805 may more accurately transmit sidelink data, which may improve power efficiency at the device 805.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for indicating a sidelink receiver as described herein, or the processor 840 and the memory 830 may be otherwise configured to perform or support such operations.

Figure 9:
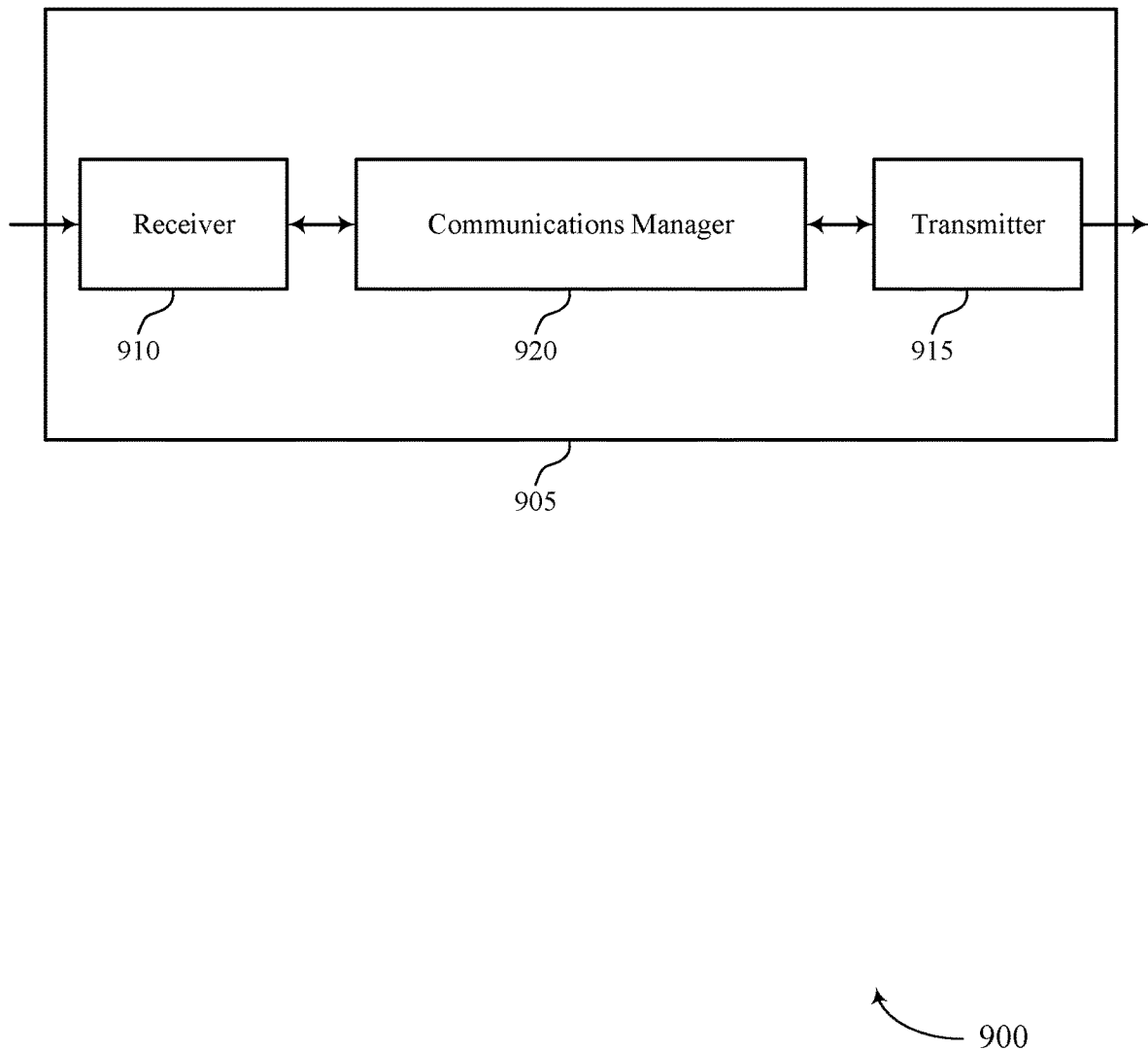
FIGS. 9 and 10 show block diagrams of devices that support techniques for indicating a sidelink receiver in accordance with one or more aspects of the present disclosure.

FIG. 9 shows a block diagram 900 of a device 905 that supports techniques for indicating a sidelink receiver in accordance with one or more aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for indicating a sidelink receiver). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for indicating a sidelink receiver). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for indicating a sidelink receiver as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving, from a first UE, an indication of a sidelink communication, the indication including a destination identifier associated with a second UE. The communications manager 920 may be configured as or otherwise support a means for transmitting, to the first UE, a grant in response to the indication, the grant indicating a mapping between a resource allocation and the destination identifier associated with the second UE. The communications manager 920 may be configured as or otherwise support a means for monitoring for a feedback message associated with a sidelink signal that is communicated with the second UE according to the resource allocation.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, more efficient utilization of communication resources, etc.

Figure 10:
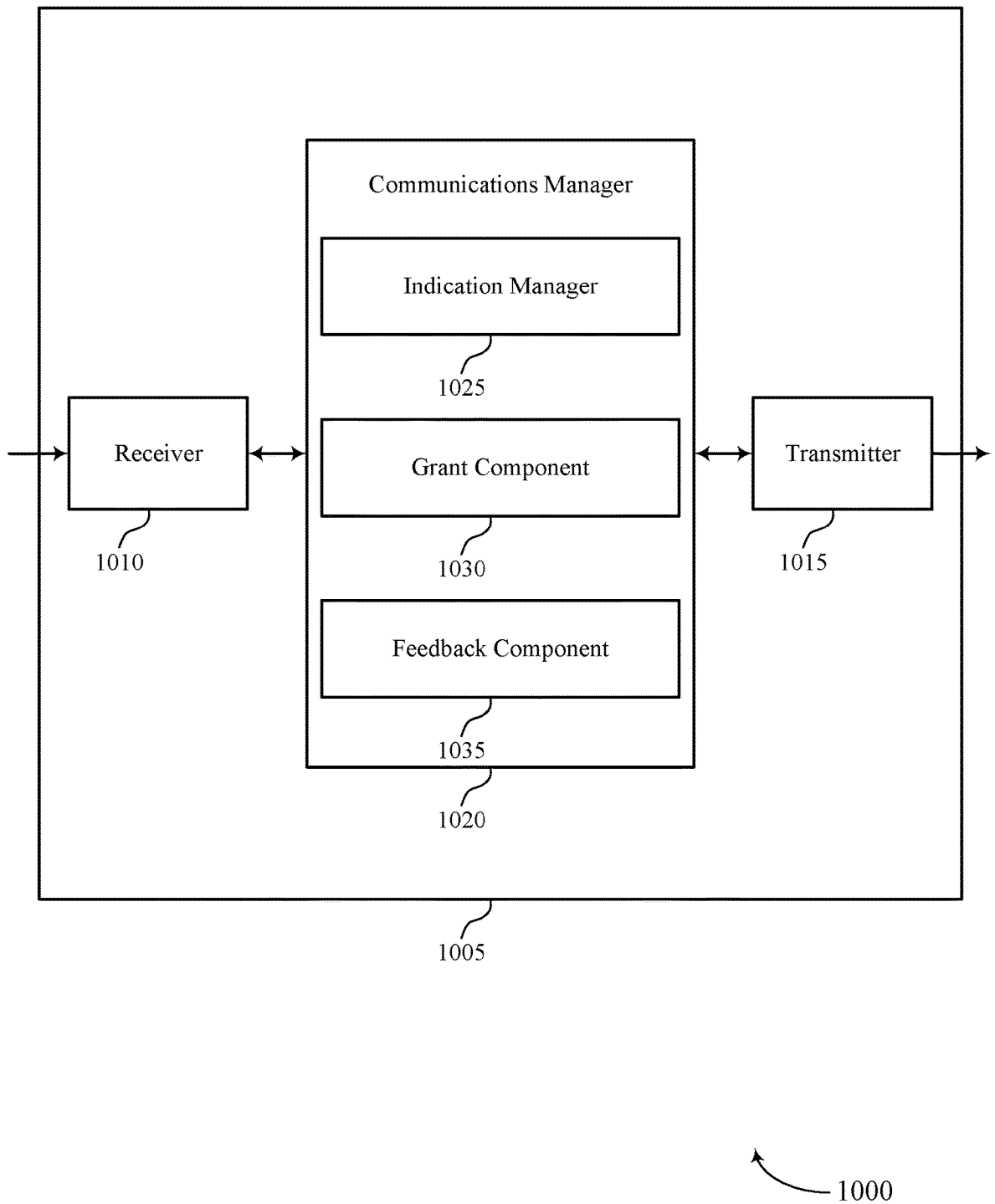

FIG. 10 shows a block diagram 1000 of a device 1005 that supports techniques for indicating a sidelink receiver in accordance with one or more aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for indicating a sidelink receiver). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for indicating a sidelink receiver). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for indicating a sidelink receiver as described herein. For example, the communications manager 1020 may include an indication manager 1025, a grant component 1030, a feedback component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The indication manager 1025 may be configured as or otherwise support a means for receiving, from a first UE, an indication of a sidelink communication, the indication including a destination identifier associated with a second UE. The grant component 1030 may be configured as or otherwise support a means for transmitting, to the first UE, a grant in response to the indication, the grant indicating a mapping between a resource allocation and the destination identifier associated with the second UE. The feedback component 1035 may be configured as or otherwise support a means for monitoring for a feedback message associated with a sidelink signal that is communicated with the second UE according to the resource allocation.

Figure 11:
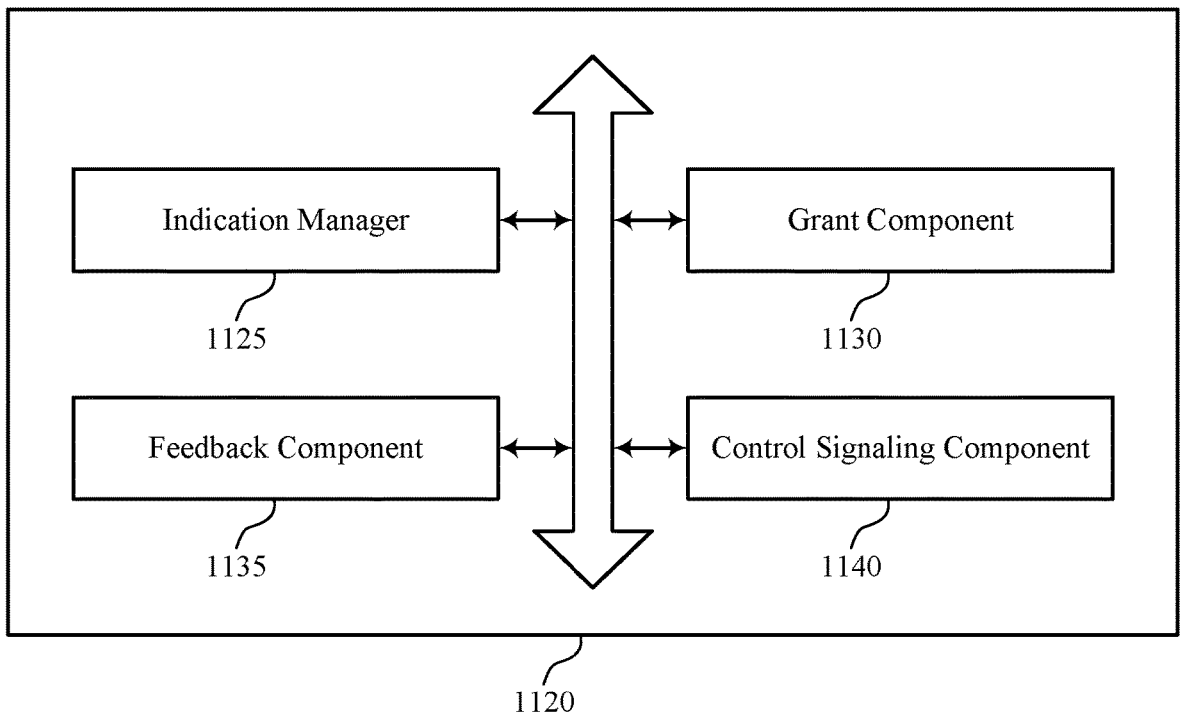
FIG. 11 shows a block diagram of a communications manager that supports techniques for indicating a sidelink receiver in accordance with one or more aspects of the present disclosure.

FIG. 11 shows a block diagram 1100 of a communications manager 1120 that supports techniques for indicating a sidelink receiver in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for indicating a sidelink receiver as described herein. For example, the communications manager 1120 may include an indication manager 1125, a grant component 1130, a feedback component 1135, a control signaling component 1140, or any combination thereof. Each of these components may communicate, directly or indirectly, with one another (e.g., via one or more buses).

The communications manager 1120 may support wireless communication at a base station in accordance with examples as disclosed herein. The indication manager 1125 may be configured as or otherwise support a means for receiving, from a first UE, an indication of a sidelink communication, the indication including a destination identifier associated with a second UE. The grant component 1130 may be configured as or otherwise support a means for transmitting, to the first UE, a grant in response to the indication, the grant indicating a mapping between a resource allocation and the destination identifier associated with the second UE. The feedback component 1135 may be configured as or otherwise support a means for monitoring for a feedback message associated with a sidelink signal that is communicated with the second UE according to the resource allocation.

In some examples, to support receiving the indication, the indication manager 1125 may be configured as or otherwise support a means for receiving the indication in an uplink transmission associated with a process number, where the mapping indicated in the grant corresponds to the process number.

In some examples, the control signaling component 1140 may be configured as or otherwise support a means for transmitting control signaling indicating an association between the process number and the destination identifier, where the grant indicates the mapping in accordance with the association.

In some examples, the feedback component 1135 may be configured as or otherwise support a means for transmitting, to the first UE, a second feedback message including the process number.

In some examples, the grant includes one or more bits of the process number.

In some examples, to support receiving the indication, the indication manager 1125 may be configured as or otherwise support a means for receiving, in the indication, a set of destination identifiers that is ordered according to the process number, the set of destination identifiers including the destination identifier associated with the second UE.

In some examples, the destination identifier includes a buffer size identifier associated with the second UE. In some examples, the buffer size identifier is received in a buffer status report.

In some examples, the destination identifier includes a layer 1 identifier, a layer 2 identifier, or both, associated with the second UE.

In some examples, the control signaling component 1140 may be configured as or otherwise support a means for transmitting control signaling indicating an association between one or more sidelink transmissions and the second UE, where the grant indicates the mapping in accordance with the association.

In some examples, the destination identifier includes a resource pool index associated with the second UE.

In some examples, the destination identifier includes a cyclic redundancy check scrambling sequence associated with the second UE.

In some examples, the grant is transmitted in a control channel element. In some examples, the grant indicates the mapping in accordance with an index of the control channel element.

In some examples, the grant is transmitted in a monitoring occasion. In some examples, the grant indicates the mapping in accordance with a configuration of the monitoring occasion.

In some examples, the grant further indicates a cast type associated with communicating the sidelink signal.

Figure 12:
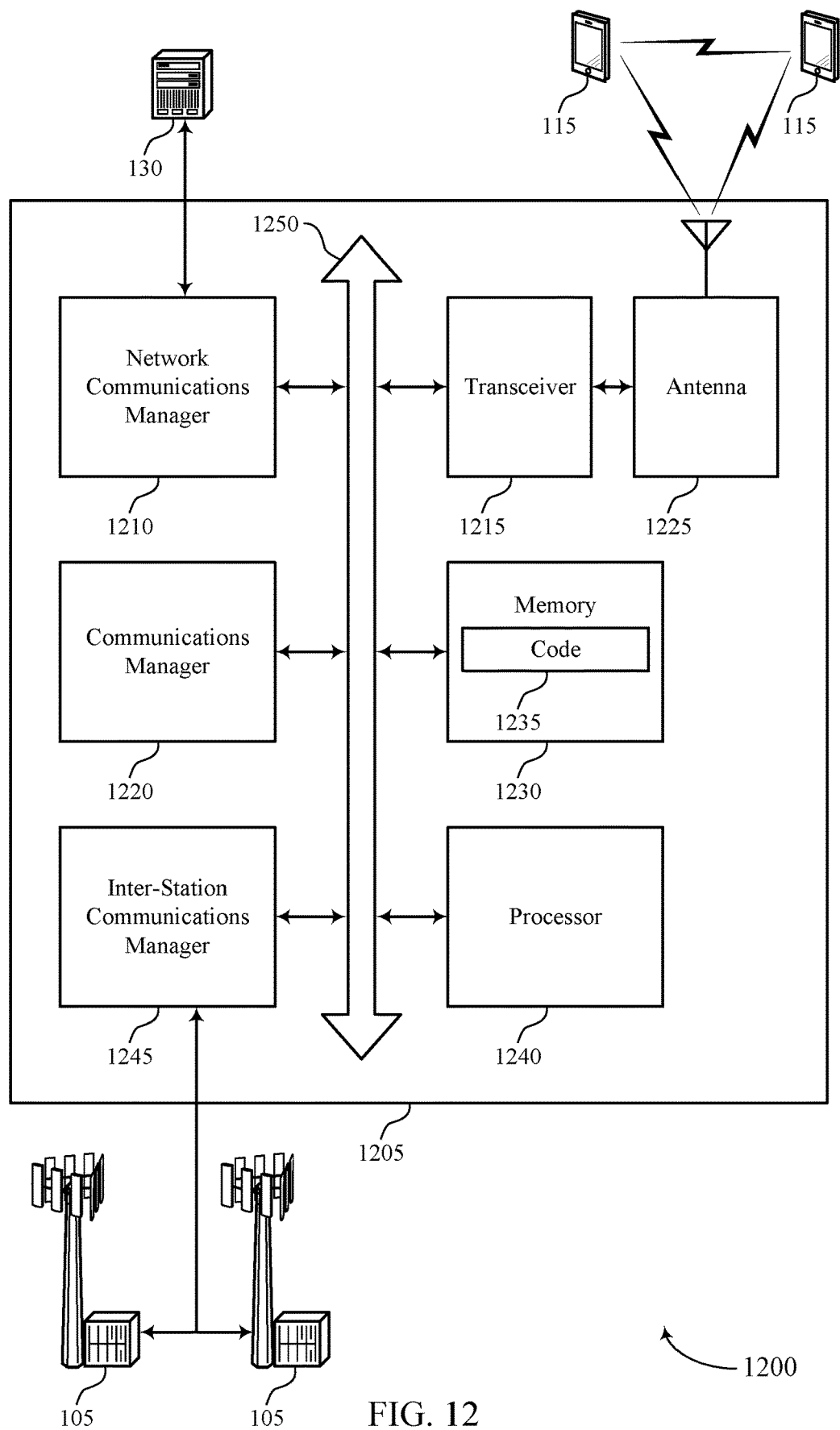
FIG. 12 shows a diagram of a system including a device that supports techniques for indicating a sidelink receiver in accordance with one or more aspects of the present disclosure.

FIG. 12 shows a diagram of a system 1200 including a device 1205 that supports techniques for indicating a sidelink receiver in accordance with one or more aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for indicating a sidelink receiver). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving, from a first UE, an indication of a sidelink communication, the indication including a destination identifier associated with a second UE. The communications manager 1220 may be configured as or otherwise support a means for transmitting, to the first UE, a grant in response to the indication, the grant indicating a mapping between a resource allocation and the destination identifier associated with the second UE. The communications manager 1220 may be configured as or otherwise support a means for monitoring for a feedback message associated with a sidelink signal that is communicated with the second UE according to the resource allocation.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, improved utilization of processing capability, etc.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for indicating a sidelink receiver as described herein, or the processor 1240 and the memory 1230 may be otherwise configured to perform or support such operations.

Figure 13:
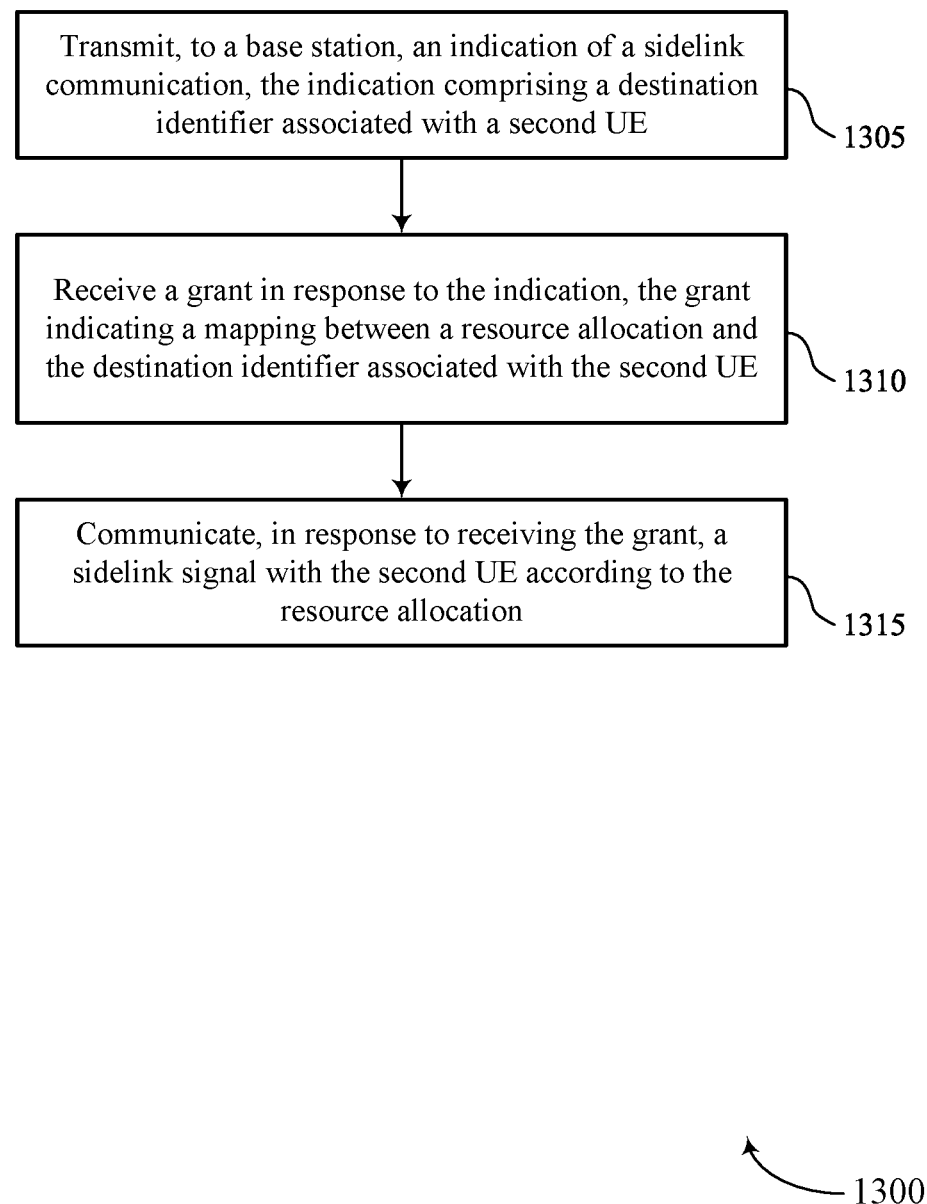
FIGS. 13 through 16 show flowcharts illustrating methods that support techniques for indicating a sidelink receiver in accordance with one or more aspects of the present disclosure.

FIG. 13 shows a flowchart illustrating a method 1300 that supports techniques for indicating a sidelink receiver in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, an indication of a sidelink communication, the indication including a destination identifier associated with a second UE. The operations of 1305 may be performed in accordance with examples as disclosed herein. In some examples, aspects of the operations of 1305 may be performed by an indication component 725 as described with reference to FIG. 7.

At 1310, the method may include receiving a grant in response to the indication, the grant indicating a mapping between a resource allocation and the destination identifier associated with the second UE. The operations of 1310 may be performed in accordance with examples as disclosed herein. In some examples, aspects of the operations of 1310 may be performed by a grant manager 730 as described with reference to FIG. 7.

At 1315, the method may include communicating, in response to receiving the grant, a sidelink signal with the second UE according to the resource allocation. The operations of 1315 may be performed in accordance with examples as disclosed herein. In some examples, aspects of the operations of 1315 may be performed by a sidelink signaling manager 735 as described with reference to FIG. 7.

Figure 14:
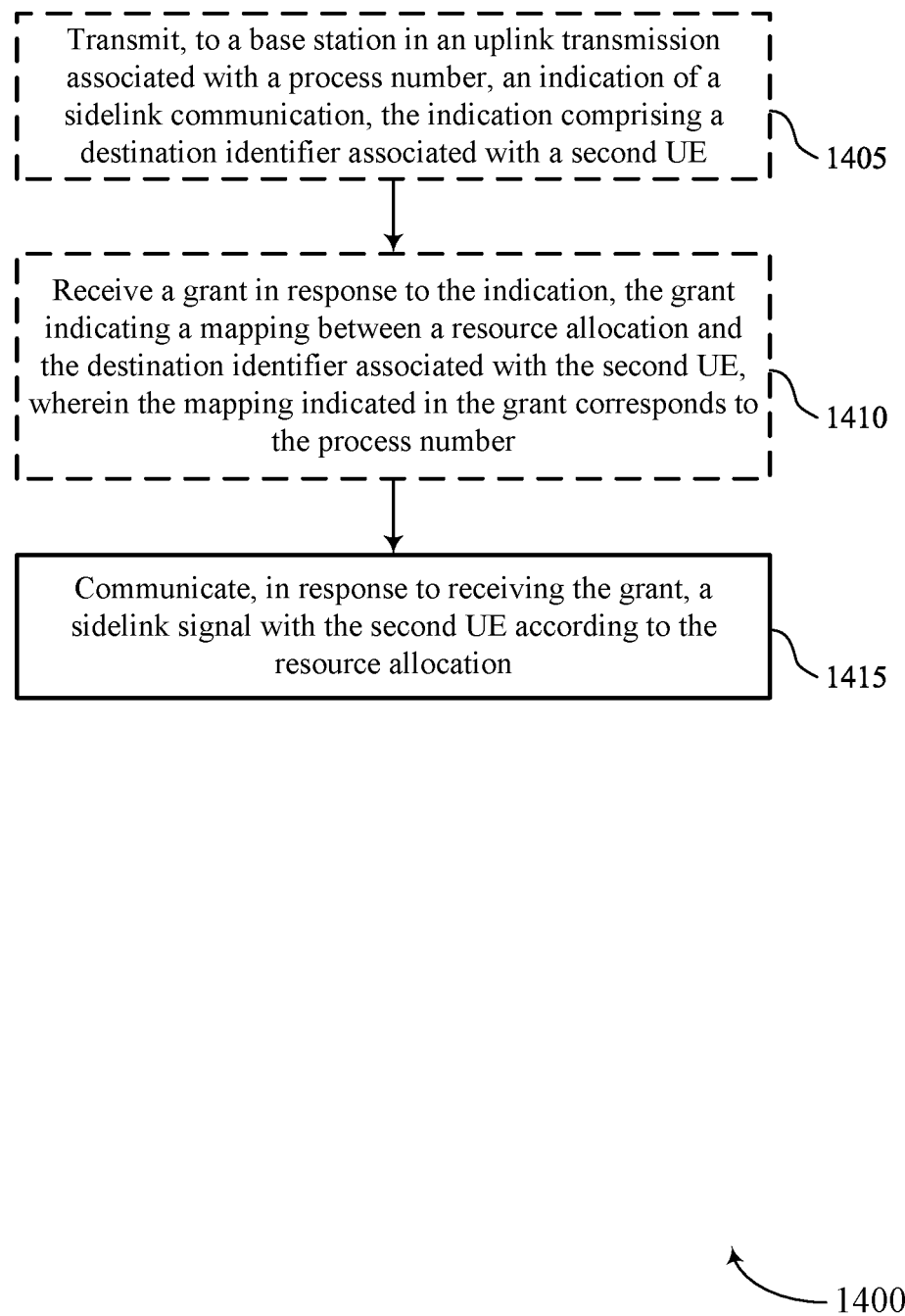

FIG. 14 shows a flowchart illustrating a method 1400 that supports techniques for indicating a sidelink receiver in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station in an uplink transmission associated with a process number, an indication of a sidelink communication, the indication including a destination identifier associated with a second UE. The operations of 1405 may be performed in accordance with examples as disclosed herein. In some examples, aspects of the operations of 1405 may be performed by an indication component 725 as described with reference to FIG. 7.

At 1410, the method may include receiving a grant in response to the indication, the grant indicating a mapping between a resource allocation and the destination identifier associated with the second UE, where the mapping indicated in the grant corresponds to the process number. The operations of 1410 may be performed in accordance with examples as disclosed herein. In some examples, aspects of the operations of 1410 may be performed by a grant manager 730 as described with reference to FIG. 7.

At 1415, the method may include communicating, in response to receiving the grant, a sidelink signal with the second UE according to the resource allocation. The operations of 1415 may be performed in accordance with examples as disclosed herein. In some examples, aspects of the operations of 1415 may be performed by a sidelink signaling manager 735 as described with reference to FIG. 7.

Figure 15:
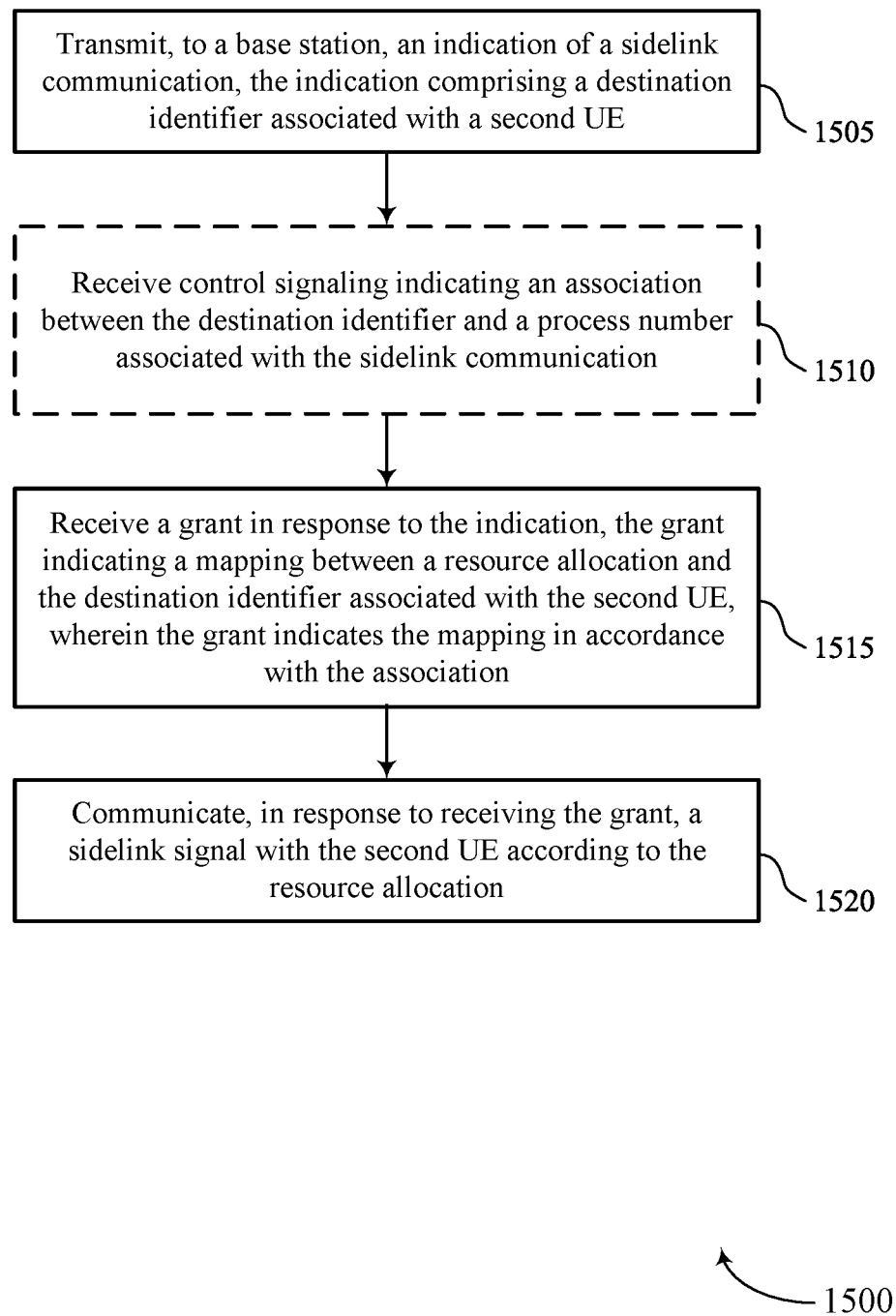

FIG. 15 shows a flowchart illustrating a method 1500 that supports techniques for indicating a sidelink receiver in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, an indication of a sidelink communication, the indication including a destination identifier associated with a second UE. The operations of 1505 may be performed in accordance with examples as disclosed herein. In some examples, aspects of the operations of 1505 may be performed by an indication component 725 as described with reference to FIG. 7.

At 1510, the method may include receiving control signaling indicating an association between the destination identifier and a process number associated with the sidelink communication. The operations of 1510 may be performed in accordance with examples as disclosed herein. In some examples, aspects of the operations of 1510 may be performed by a control signaling manager 740 as described with reference to FIG. 7.

At 1515, the method may include receiving a grant in response to the indication, the grant indicating a mapping between a resource allocation and the destination identifier associated with the second UE, where the grant indicates the mapping in accordance with the association. The operations of 1515 may be performed in accordance with examples as disclosed herein. In some examples, aspects of the operations of 1515 may be performed by a grant manager 730 as described with reference to FIG. 7.

At 1520, the method may include communicating, in response to receiving the grant, a sidelink signal with the second UE according to the resource allocation. The operations of 1520 may be performed in accordance with examples as disclosed herein. In some examples, aspects of the operations of 1520 may be performed by a sidelink signaling manager 735 as described with reference to FIG. 7.

Figure 16:
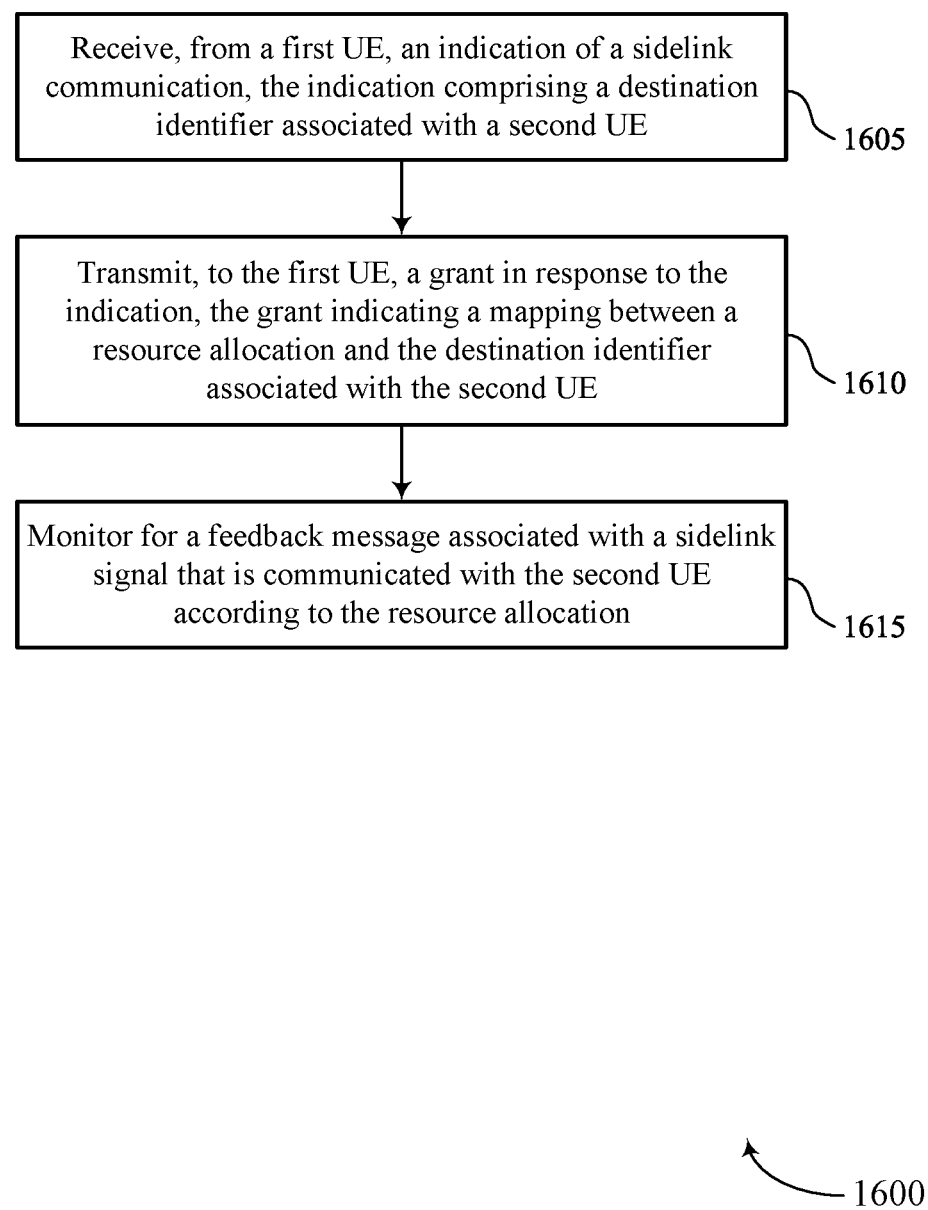

FIG. 16 shows a flowchart illustrating a method 1600 that supports techniques for indicating a sidelink receiver in accordance with one or more aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a first UE, an indication of a sidelink communication, the indication including a destination identifier associated with a second UE. The operations of 1605 may be performed in accordance with examples as disclosed herein. In some examples, aspects of the operations of 1605 may be performed by an indication manager 1125 as described with reference to FIG. 11.

At 1610, the method may include transmitting, to the first UE, a grant in response to the indication, the grant indicating a mapping between a resource allocation and the destination identifier associated with the second UE. The operations of 1610 may be performed in accordance with examples as disclosed herein. In some examples, aspects of the operations of 1610 may be performed by a grant component 1130 as described with reference to FIG. 11.

At 1615, the method may include monitoring for a feedback message associated with a sidelink signal that is communicated with the second UE according to the resource allocation. The operations of 1615 may be performed in accordance with examples as disclosed herein. In some examples, aspects of the operations of 1615 may be performed by a feedback component 1135 as described with reference to FIG. 11.

The following provides an overview of aspects of the present disclosure:

Aspect 1: A method for wireless communication at a first UE, comprising: transmitting, to a base station, an indication of a sidelink communication, the indication comprising a destination identifier associated with a second UE; receiving a grant in response to the indication, the grant indicating a mapping between a resource allocation and the destination identifier associated with the second UE; and communicating, in response to receiving the grant, a sidelink signal with the second UE according to the resource allocation.

Aspect 2: The method of aspect 1, wherein transmitting the indication comprises: transmitting the indication in an uplink transmission associated with a process number, wherein the mapping indicated in the grant corresponds to the process number.

Aspect 3: The method of aspect 2, further comprising: receiving, prior to communicating the sidelink signal, a feedback message from the base station, the feedback message comprising the process number.

Aspect 4: The method of any of aspects 2 through 3, wherein the grant comprises one or more bits of the process number.

Aspect 5: The method of any of aspects 2 through 4, wherein transmitting the indication further comprises: transmitting, in the indication, a set of destination identifiers that is ordered according to the process number, the set of destination identifiers comprising the destination identifier associated with the second UE.

Aspect 6: The method of any of aspects 1 through 5, further comprising: receiving control signaling indicating an association between the destination identifier and a process number associated with the sidelink communication, wherein the grant indicates the mapping in accordance with the association.

Aspect 7: The method of any of aspects 1 through 6, further comprising: receiving a second grant in response to the indication, the second grant indicating a second mapping between a second resource allocation and a second destination identifier associated with a third UE, wherein the indication comprises the second destination identifier associated with the third UE, and wherein the second destination identifier corresponds to a zero buffer size.

Aspect 8: The method of aspect 7, further comprising: transmitting, in response to the second grant, a feedback message to the base station based at least in part on the zero buffer size.

Aspect 9: The method of any of aspects 7 through 8, further comprising: transmitting, in response to the second grant, a second sidelink signal to a fourth UE according to the second resource allocation.

Aspect 10: The method of aspect 9, wherein an index corresponding to a third destination identifier associated with the fourth UE is greater than an index corresponding to the second destination identifier associated with the third UE.

Aspect 11: The method of any of aspects 9 through 10, wherein an index corresponding to a third destination identifier associated with the fourth UE is less than an index corresponding to the second destination identifier associated with the third UE.

Aspect 12: The method of any of aspects 1 through 11, wherein the destination identifier comprises a buffer size identifier associated with the second UE; and the buffer size identifier is transmitted in a buffer status report.

Aspect 13: The method of any of aspects 1 through 12, wherein the destination identifier comprises a layer 1 identifier, a layer 2 identifier, or both, associated with the second UE.

Aspect 14: The method of any of aspects 1 through 13, further comprising: receiving control signaling indicating an association between one or more sidelink transmissions and the second UE, wherein the grant indicates the mapping in accordance with the association.

Aspect 15: The method of any of aspects 1 through 14, wherein the destination identifier comprises a resource pool index associated with the second UE.

Aspect 16: The method of any of aspects 1 through 15, wherein the destination identifier comprises a cyclic redundancy check scrambling sequence associated with the second UE.

Aspect 17: The method of any of aspects 1 through 16, wherein the grant is received in a control channel element; and the grant indicates the mapping in accordance with an index of the control channel element.

Aspect 18: The method of any of aspects 1 through 17, wherein the grant is received in a monitoring occasion; and the grant indicates the mapping in accordance with a configuration of the monitoring occasion.

Aspect 19: The method of any of aspects 1 through 18, wherein the grant further indicates a cast type associated with communicating the sidelink signal.

Aspect 20: The method of any of aspects 1 through 19, wherein communicating the sidelink signal comprises: transmitting, in response to receiving the grant, the sidelink signal to the second UE according to the resource allocation Aspect 21: The method of any of aspects 1 through 20, wherein communicating the sidelink signal comprises: receiving, in response to receiving the grant, the sidelink signal from the second UE according to the resource allocation.

Aspect 22: A method for wireless communication at a base station, comprising: receiving, from a first UE, an indication of a sidelink communication, the indication comprising a destination identifier associated with a second UE; transmitting, to the first UE, a grant in response to the indication, the grant indicating a mapping between a resource allocation and the destination identifier associated with the second UE; and monitoring for a feedback message associated with a sidelink signal that is communicated with the second UE according to the resource allocation.

Aspect 23: The method of aspect 22, wherein receiving the indication comprises: receiving the indication in an uplink transmission associated with a process number, wherein the mapping indicated in the grant corresponds to the process number.

Aspect 24: The method of aspect 23, further comprising: transmitting control signaling indicating an association between the process number and the destination identifier, wherein the grant indicates the mapping in accordance with the association Aspect 25: The method of any of aspects 23 through 24, further comprising: transmitting, to the first UE, a second feedback message comprising the process number.

Aspect 26: The method of any of aspects 23 through 25, wherein the grant comprises one or more bits of the process number.

Aspect 27: The method of any of aspects 23 through 26, wherein receiving the indication further comprises: receiving, in the indication, a set of destination identifiers that is ordered according to the process number, the set of destination identifiers comprising the destination identifier associated with the second UE.

Aspect 28: The method of any of aspects 22 through 27, wherein the destination identifier comprises a buffer size identifier associated with the second UE; and the buffer size identifier is received in a buffer status report Aspect 29: The method of any of aspects 22 through 28, wherein the destination identifier comprises a layer 1 identifier, a layer 2 identifier, or both, associated with the second UE.

Aspect 30: The method of any of aspects 22 through 29, further comprising: transmitting control signaling indicating an association between one or more sidelink transmissions and the second UE, wherein the grant indicates the mapping in accordance with the association.

Aspect 31: The method of any of aspects 22 through 30, wherein the destination identifier comprises a resource pool index associated with the second UE.

Aspect 32: The method of any of aspects 22 through 31, wherein the destination identifier comprises a cyclic redundancy check scrambling sequence associated with the second UE.

Aspect 33: The method of any of aspects 22 through 32, wherein the grant is transmitted in a control channel element; and the grant indicates the mapping in accordance with an index of the control channel element.

Aspect 34: The method of any of aspects 22 through 33, wherein the grant is transmitted in a monitoring occasion; and the grant indicates the mapping in accordance with a configuration of the monitoring occasion.

Aspect 35: The method of any of aspects 22 through 34, wherein the grant further indicates a cast type associated with communicating the sidelink signal.

Aspect 36: An apparatus for wireless communication at a first UE, comprising a processor; and memory coupled to the processor, the processor and memory configured to perform a method of any of aspects 1 through 21.

Aspect 37: An apparatus for wireless communication at a first UE, comprising at least one means for performing a method of any of aspects 1 through 21.

Aspect 38: A non-transitory computer-readable medium storing code for wireless communication at a first UE, the code comprising instructions executable by a processor to perform a method of any of aspects 1 through 21.

Aspect 39: An apparatus for wireless communication at a base station, comprising a processor; and memory coupled to the processor, the processor and memory configured to perform a method of any of aspects 22 through 35.

Aspect 40: An apparatus for wireless communication at a base station, comprising at least one means for performing a method of any of aspects 22 through 35.

Aspect 41: A non-transitory computer-readable medium storing code for wireless communication at a base station, the code comprising instructions executable by a processor to perform a method of any of aspects 22 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    one or more memories; and
    one or more processors coupled with the one or more memories and configured to cause the first UE to:
        transmit, to a network device, an indication of a sidelink communication, the indication associated with a buffer status report, wherein the indication comprises a set of destination identifiers that includes a plurality of destination identifiers ordered by the first UE based at least in part on a priority associated with each entry in the buffer status report, and wherein the plurality of destination identifiers comprises a first destination identifier associated with a second UE;
        receive, in response to the indication, a grant that indicates a mapping between a resource allocation and the first destination identifier associated with the second UE, wherein the mapping is based at least in part on the order of the plurality of destination identifiers of the set of destination identifiers; and
        communicate, in response to the grant, a sidelink signal with the second UE based at least in part on the resource allocation.

2. The apparatus of claim 1, wherein the one or more processors are further configured to cause the first UE to:
transmit the indication in an uplink transmission associated with a process number, wherein the mapping indicated in the grant corresponds to the process number.

3. The apparatus of claim 2, wherein the one or more processors are further configured to cause the first UE to:
receive, prior to the communication of the sidelink signal, a feedback message from the network device, wherein the feedback message comprises the process number.

4. The apparatus of claim 2, wherein the grant comprises one or more bits of the process number.

5. The apparatus of claim 2, wherein the plurality of destination identifiers of the set of destination identifiers are further ordered based at least in part on the process number.

6. The apparatus of claim 1, wherein the one or more processors are further configured to cause the first UE to:
receive control signaling that indicates an association between the first destination identifier associated with the second UE and a process number associated with the sidelink communication, wherein the grant indicates the mapping in accordance with the association.

7. The apparatus of claim 1, wherein:
the first destination identifier associated with the second UE comprises a buffer size identifier associated with the second UE; and
the buffer size identifier is transmitted in the buffer status report.

8. The apparatus of claim 1, wherein the one or more processors are further configured to cause the first UE to:
receive control signaling that indicates an association between one or more sidelink transmissions and the second UE, wherein the grant indicates the mapping in accordance with the association.

9. The apparatus of claim 1, wherein the grant further indicates a cast type associated with the communication of the sidelink signal.

10. The apparatus of claim 1, wherein, to communicate the sidelink signal, the one or more processors are configured to cause the first UE to:
transmit, in response to the grant, the sidelink signal to the second UE based at least in part on the resource allocation.

11. The apparatus of claim 1, wherein, to communicate the sidelink signal, the one or more processors are configured to cause the first UE to:
receive, in response to the grant, the sidelink signal from the second UE based at least in part on the resource allocation.

12. An apparatus for wireless communication at a network device comprising:
one or more memories; and
one or more processors coupled with the one or more memories and configured to cause the network device to:
obtain an indication of a sidelink communication between a first user equipment (UE) and a second UE, the indication associated with a buffer status report, wherein the indication comprises a set of destination identifiers that includes a plurality of destination identifiers ordered in the indication based at least in part on a priority associated with each entry in the buffer status report, and wherein the plurality of destination identifiers comprises a first destination identifier associated with the second UE;
output in response to the indication, a grant that indicates a mapping between a resource allocation and the first destination identifier associated with the second UE, wherein the mapping is based at least in part on the order of the plurality of destination identifiers of the set of destination identifiers; and
monitor for a feedback message associated with a sidelink signal that is based at least in part on the resource allocation.

13. The apparatus of claim 12, wherein the one or more processors are further configured to cause the network device to:
obtain the indication in an uplink transmission associated with a process number, wherein the mapping indicated in the grant corresponds to the process number.

14. The apparatus of claim 12, wherein:
the first destination identifier associated with the second UE comprises a buffer size identifier associated with the second UE; and
the buffer size identifier is received in the buffer status report.

15. The apparatus of claim 12, wherein the one or more processors are further configured to cause the network device to:
output control signaling that indicates an association between one or more sidelink transmissions and the second UE, wherein the grant indicates the mapping in accordance with the association.

16. A method for wireless communication at a first user equipment (UE), comprising:
transmitting, to a network device, an indication of a sidelink communication, the indication associated with a buffer status report, wherein the indication comprises a set of destination identifiers that includes a plurality of destination identifiers ordered by the first UE based at least in part on a priority associated with each entry in the buffer status report, the set of destination identifiers comprising a first destination identifier associated with a second UE;
receiving a grant in response to the indication, the grant indicating a mapping between a resource allocation and the first destination identifier associated with the second UE, wherein the mapping is based at least in part on the order of the plurality of destination identifiers of the plurality of destination identifiers; and
communicating, in response to receiving the grant, a sidelink signal with the second UE according to the resource allocation.

17. The method of claim 16, further comprising:
transmitting the indication in an uplink transmission associated with a process number, the mapping indicated in the grant corresponding to the process number.

18. The method of claim 17, further comprising:
receiving, prior to the communication of the sidelink signal, a feedback message from the network device that comprises the process number.

19. The method of claim 17, the grant comprising one or more bits of the process number.

20. The method of claim 17, wherein the plurality of destination identifiers of the set of destination identifiers is further ordered based at least in part on the process number.

21. The method of claim 16, further comprising:
receiving control signaling that indicates an association between the first destination identifier associated with the second UE and a process number associated with the sidelink communication, wherein the grant indicates the mapping in accordance with the association.

22. The method of claim 16, wherein:
the first destination identifier associated with the second UE comprises a buffer size identifier associated with the second UE; and
the buffer size identifier is transmitted in the buffer status report.

23. The method of claim 16, further comprising:
receiving control signaling that indicates an association between one or more sidelink transmissions and the second UE, wherein the grant indicates the mapping in accordance with the association.

24. The method of claim 16, wherein the grant further indicates a cast type associated with the communication of the sidelink signal.

25. A method for wireless communication at a network device, comprising:
obtaining an indication of a sidelink communication between a first user equipment (UE) and a second UE, the indication associated with a buffer status report, wherein the indication comprises a set of destination identifiers that includes a plurality of destination identifiers ordered in the indication based at least in part on a priority associated with each entry in the buffer status report, the plurality of destination identifiers comprising a first destination identifier associated with the second UE;
outputting a grant in response to the indication, the grant indicating a mapping between a resource allocation and the first destination identifier associated with the second UE, the mapping being based at least in part on the order of the plurality of destination identifiers of the set of destination identifiers; and
monitoring for a feedback message associated with a sidelink signal that is based at least in part on the resource allocation.

26. The method of claim 25, further comprising:
obtaining the indication in an uplink transmission associated with a process number, wherein the mapping indicated in the grant corresponds to the process number.

27. The method of claim 25, wherein:
the first destination identifier associated with the second UE comprises a buffer size identifier associated with the second UE; and
the buffer size identifier being received in the buffer status report.

28. The method of claim 25, further comprising:
outputting control signaling that indicates an association between one or more sidelink transmissions and the second UE, wherein the grant indicates the mapping in accordance with the association.

29. A non-transitory computer-readable medium storing code for wireless communication at a first user equipment (UE), the code comprising instructions executable by one or more processors to cause the first UE to:
transmit, to a network device, an indication of a sidelink communication, the indication associated with a buffer status report, wherein the indication comprises a set of destination identifiers that includes a plurality of destination identifiers ordered by the first UE based at least in part on a priority associated with each entry in the buffer status report, and wherein the plurality of destination identifiers comprises a first destination identifier associated with a second UE;
receive a grant in response to the indication, the grant indicating a mapping between a resource allocation and the first destination identifier associated with the second UE, wherein the mapping is based at least in part on the order of the plurality of destination identifiers of the set of destination identifiers; and
communicate, in response to receiving the grant, a sidelink signal with the second UE based at least in part on the resource allocation.

30. A non-transitory computer-readable medium storing code for wireless communication at a network device, the code comprising instructions executable by one or more processors to cause the network device to:
obtain an indication of a sidelink communication between a first user equipment (UE) and a second UE, the indication associated with a buffer status report, wherein the indication comprises a set of destination identifiers that includes a plurality of destination identifiers ordered in the indication based at least in part on a priority associated with each entry in the buffer status report, and wherein the plurality of destination identifiers comprises a destination identifier associated with the second UE;
output a grant in response to the indication that indicates a mapping between a resource allocation and the destination identifier associated with the second UE, wherein the mapping is based at least in part on the order of the plurality of destination identifiers of the set of destination identifiers; and
monitor for a feedback message associated with a sidelink signal that is based at least in part on the resource allocation.

* * * * *